US012710356B2

(12) United States Patent
Ohno et al.

(10) Patent No.: US 12,710,356 B2
(45) Date of Patent: Aug. 18, 2026

(54) OPTICAL INSPECTION METHOD, NON-TRANSITORY STORAGE MEDIUM, AND OPTICAL INSPECTION APPARATUS

(71) Applicants: KABUSHIKI KAISHA TOSHIBA, Tokyo (JP); TOSHIBA INFORMATION SYSTEMS (JAPAN) CORPORATION, Kawasaki Kanagawa (JP)

(72) Inventors: Hiroshi Ohno, Tokyo (JP); Hiroya Kano, Kawasaki Kanagawa (JP); Takahiro Kamikawa, Yokohama Kanagawa (JP); Hideaki Okano, Yokohama Kanagawa (JP); Sayuri Suzuki, Kawasaki Kanagawa (JP); Chisa Hirakawa, Kawasaki Kanagawa (JP); Akifumi Ohno, Kawasaki Kanagawa (JP); Yoshiaki Takagi, Kawasaki Kanagawa (JP)

(73) Assignees: KABUSHIKI KAISHA TOSHIBA, Kawasaki (JP); TOSHIBA INFORMATION SYSTEMS (JAPAN) CORPORATION, Kawasaki (JP)

( * ) Notice: Subject to any disclaimer, the term of this patent is extended or adjusted under 35 U.S.C. 154(b) by 218 days.

(21) Appl. No.: 18/464,425

(22) Filed: Sep. 11, 2023

(65) Prior Publication Data

US 2024/0319078 A1 Sep. 26, 2024

(30) Foreign Application Priority Data

Mar. 22, 2023 (JP) ................................ 2023-045753

(51) Int. Cl.
*G01N 21/25* (2006.01)
*G01N 21/01* (2006.01)
(Continued)

(52) U.S. Cl.
CPC .......... *G01N 21/255* (2013.01); *G01N 21/01* (2013.01); *G01N 21/55* (2013.01);
(Continued)

(58) Field of Classification Search
CPC ...... G01N 21/255; G01N 21/01; G01N 21/55; G01N 21/8806; G01N 21/8851;
(Continued)

(56) References Cited

U.S. PATENT DOCUMENTS 5,675,407 A 10/1997 Geng
6,384,917 B1 * 5/2002 Fradkin .................... G01J 3/51 356/402
(Continued)

FOREIGN PATENT DOCUMENTS

CN 108827981 A1 11/2018
JP 2005-24560 A 1/2005
(Continued)

OTHER PUBLICATIONS

Walton L. Howes, "Rainbow schlieren and its applications," Applied Optics, vol. 23, No. 14, pp. 2449-2460 (1984).
(Continued)

*Primary Examiner* — Michelle M Iacoletti
*Assistant Examiner* — Noah J. Haney
(74) *Attorney, Agent, or Firm* — Finnegan, Henderson, Farabow, Garrett & Dunner, LLP

(57) ABSTRACT

According to an embodiment, an optical inspection method includes: causing a wavelength selection portion to selectively pass light components including at least two different wavelength spectra from an object point and causing an imaging portion including at least two color channels configured to receive the light components of the wavelength spectra to capture the object point; defining the light components of the at least two different wavelength spectra as
(Continued)

signal vectors having different directions based on light reception data in the at least two color channels for the object point; and estimating spread of a direction distribution of light at the object point based on the directions of the signal vectors.

13 Claims, 16 Drawing Sheets

(51) Int. Cl.

| | |
|---|---|
| ***G01N 21/17*** | (2006.01) |
| ***G01N 21/31*** | (2006.01) |
| ***G01N 21/47*** | (2006.01) |
| ***G01N 21/55*** | (2014.01) |
| ***G01N 21/57*** | (2006.01) |
| ***G01N 21/64*** | (2006.01) |
| ***G01N 21/88*** | (2006.01) |
| ***G01N 21/95*** | (2006.01) |

(52) U.S. Cl.
CPC ..... *G01N 21/8806* (2013.01); *G01N 21/8851* (2013.01); *G01N 2021/1776* (2013.01); *G01N 2021/3155* (2013.01); *G01N 2021/4711* (2013.01); *G01N 2021/555* (2013.01); *G01N 2021/556* (2013.01); *G01N 2021/559* (2013.01); *G01N 21/57* (2013.01); *G01N 21/6402* (2013.01); *G01N 2021/8835* (2013.01); *G01N 2021/8845* (2013.01); *G01N 21/95* (2013.01)

(58) Field of Classification Search
CPC .... G01N 21/57; G01N 21/6402; G01N 21/95; G01N 2021/1776; G01N 2021/3155; G01N 2021/4711; G01N 2021/555; G01N 2021/556; G01N 2021/559; G01N 2021/8835; G01N 2021/8845
USPC .......... 356/432, 407, 402, 337, 237.1–241.6, 356/416, 419
See application file for complete search history.

(56) References Cited

U.S. PATENT DOCUMENTS

| | | | | |
|---|---|---|---|---|
| 7,505,149 | B2 * | 3/2009 | Ishiba | G01R 31/309 356/612 |
| 8,345,252 | B2 * | 1/2013 | Nisper | G01N 21/251 356/402 |
| 10,113,910 | B2 * | 10/2018 | Brunk | G01J 3/2803 |
| 10,648,920 | B2 * | 5/2020 | Taglione | G01N 21/8806 |
| 10,732,102 | B2 | 8/2020 | Ohno et al. | |
| 10,812,786 | B2 | 10/2020 | Ohno et al. | |
| 11,852,591 | B2 * | 12/2023 | Naruse | G06V 10/25 |
| 2004/0263832 | A1 | 12/2004 | Jones et al. | |
| 2008/0246966 | A1 * | 10/2008 | Oomori | G01N 21/956 356/445 |
| 2011/0007333 | A1 * | 1/2011 | Ishii | H04N 1/60 358/1.9 |
| 2012/0032973 | A1 * | 2/2012 | Sano | G06T 15/506 345/593 |
| 2014/0268105 | A1 | 9/2014 | Bills et al. | |
| 2015/0016711 | A1 * | 1/2015 | Tin | G06V 10/143 382/152 |
| 2015/0130925 | A1 * | 5/2015 | Park | G06T 7/0004 348/87 |
| 2016/0202048 | A1 | 7/2016 | Meng et al. | |
| 2018/0047208 | A1 * | 2/2018 | Marin | H04N 13/257 |
| 2018/0180534 | A1 * | 6/2018 | Noda | G01N 21/474 |
| 2021/0131961 | A1 * | 5/2021 | Ohno | G01N 21/474 |
| 2021/0293723 | A1 * | 9/2021 | Ohno | G01N 21/85 |
| 2021/0375003 | A1 * | 12/2021 | Ihara | H04N 5/30 |
| 2022/0086326 | A1 | 3/2022 | Ohno et al. | |

FOREIGN PATENT DOCUMENTS

| | | | |
|---|---|---|---|
| JP | 2016-128816 | A | 7/2016 |
| JP | 2018-128436 | A | 8/2018 |
| JP | 2019-124542 | A | 7/2019 |
| JP | 2019-203796 | A | 11/2019 |
| JP | 2021-76423 | A | 5/2021 |
| JP | 2022-49881 | A | 3/2022 |

OTHER PUBLICATIONS

Hiroshi Ohno, "One-shot three-dimensional measurement method with the color mapping of light direction," OSA Continuum, vol. 4, No. 3, pp. 840-848, DOI: 10.1364/OSAC.417511 (2021).

Japan Patent Office, Office Action in JP App. No. 2023-045753 (May 26, 2026).

* cited by examiner

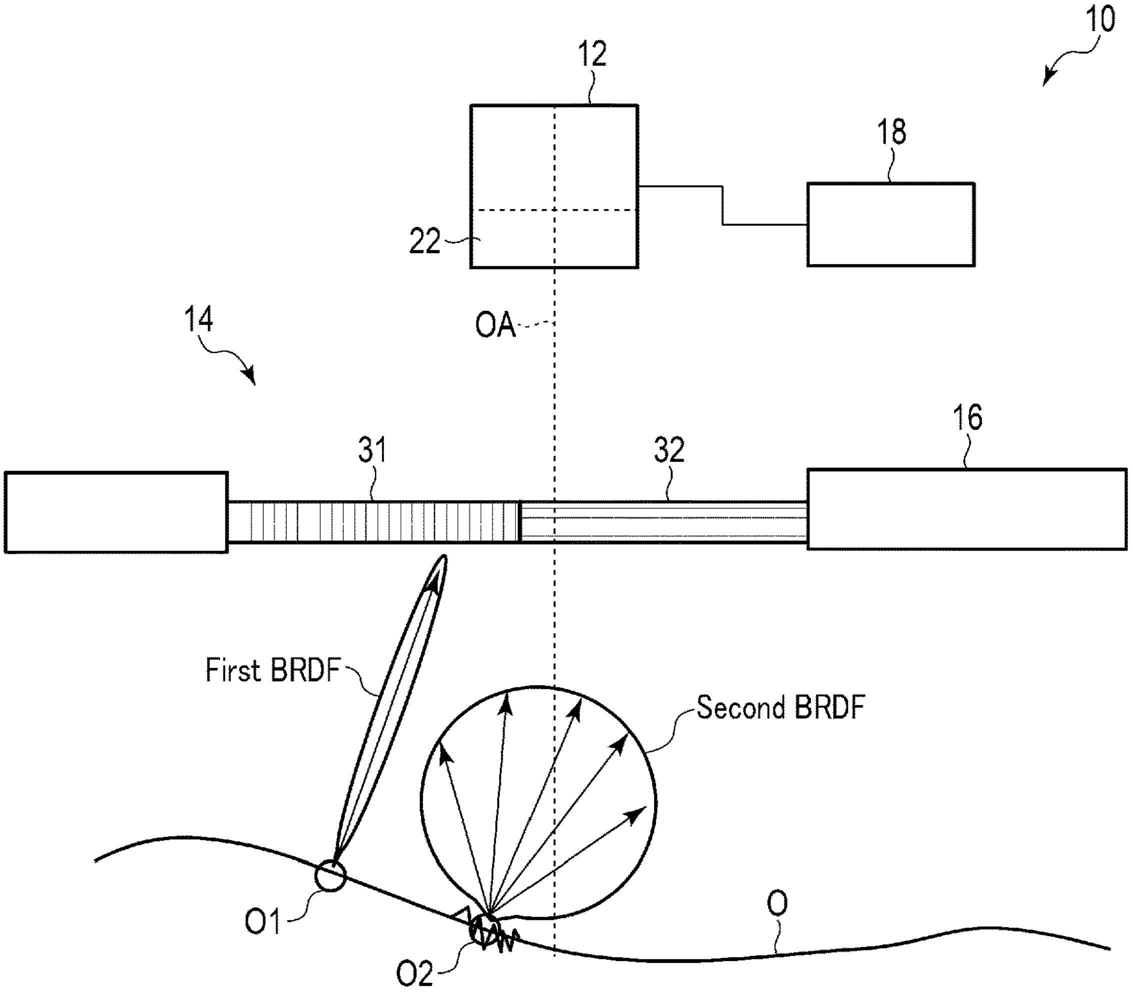
F I G. 1
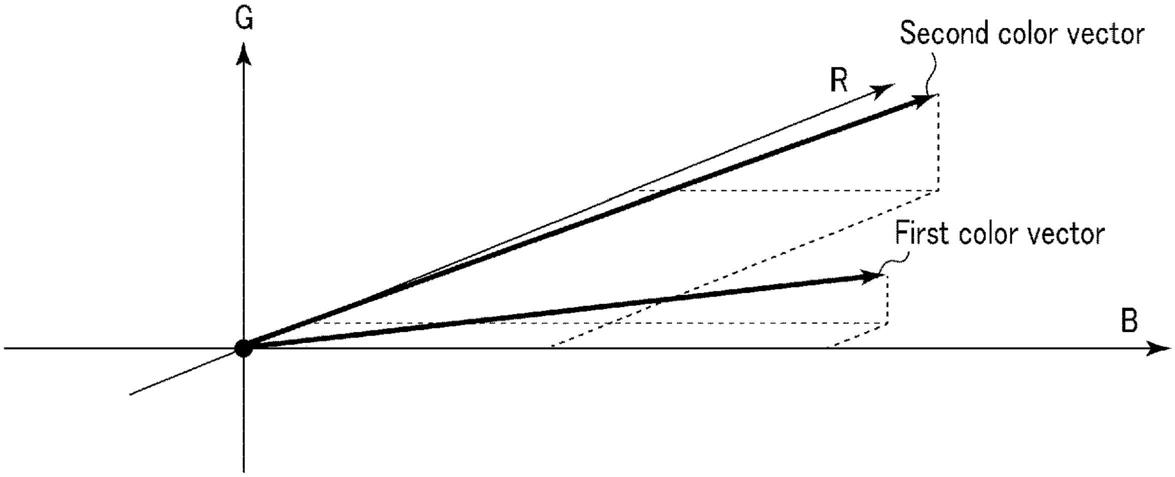
F I G. 2

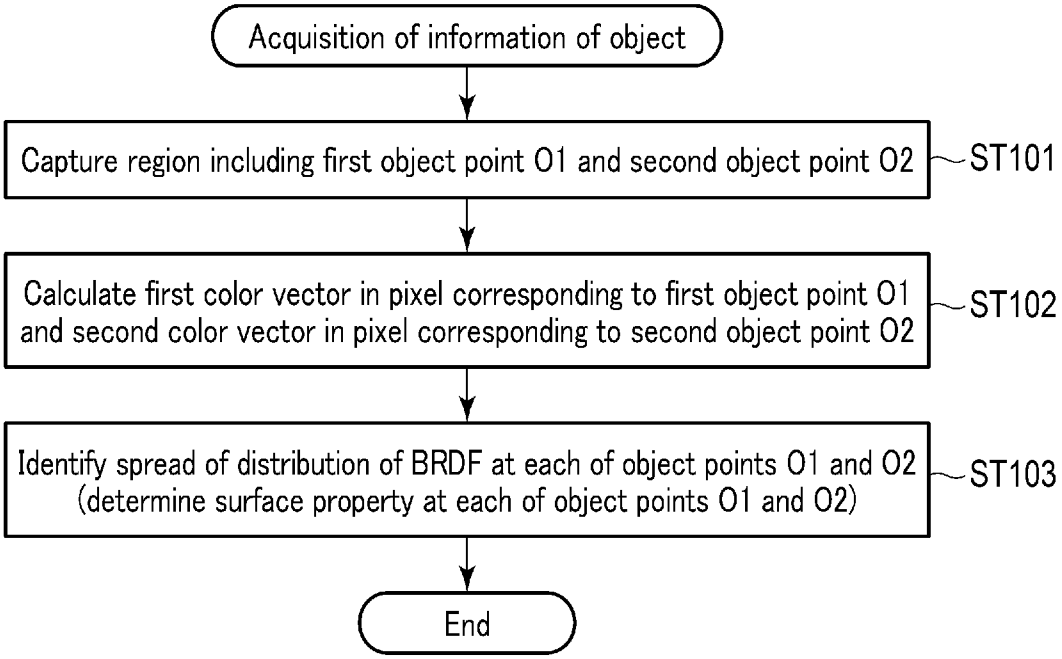
F I G. 3
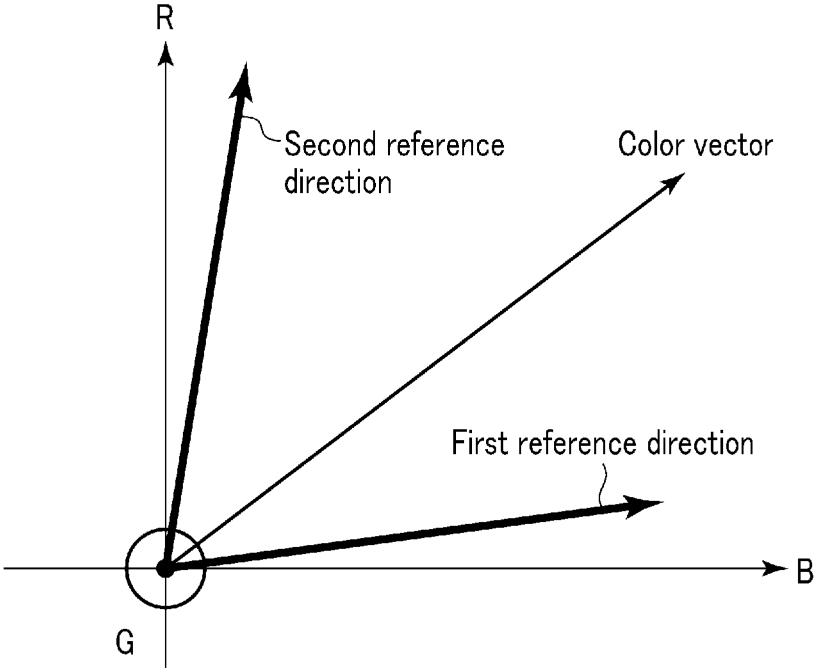
F I G. 4

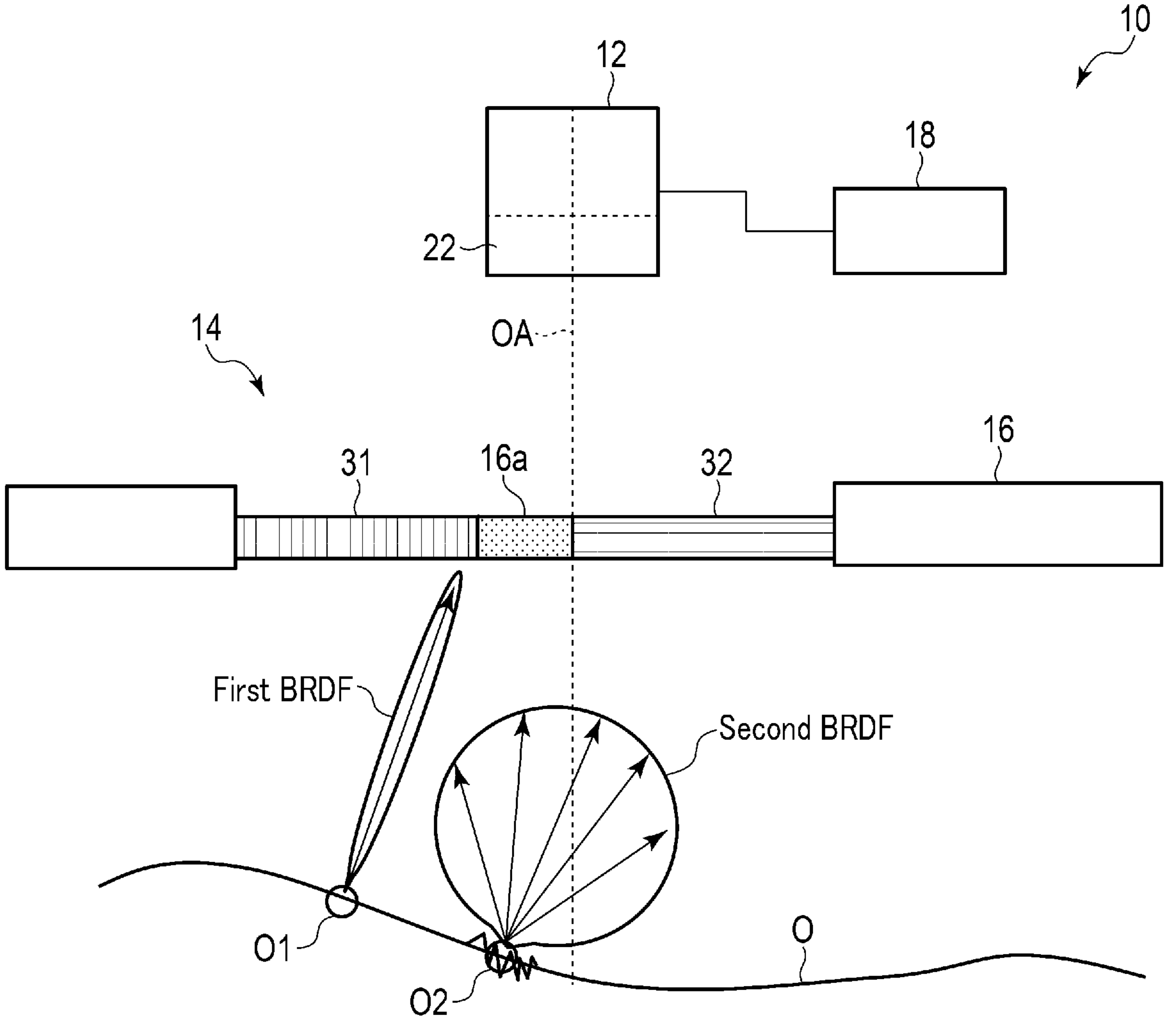
F I G. 6

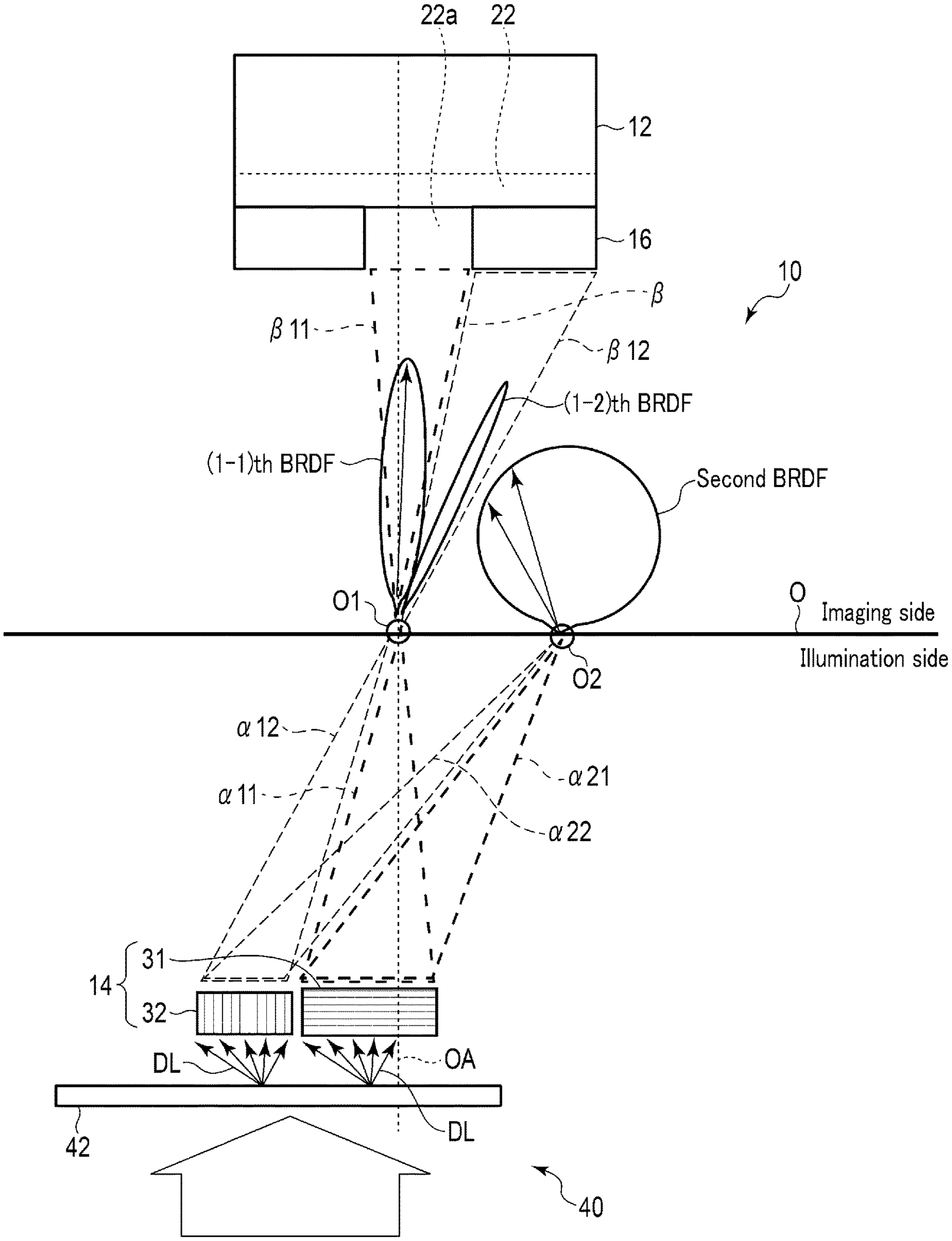
F I G. 10

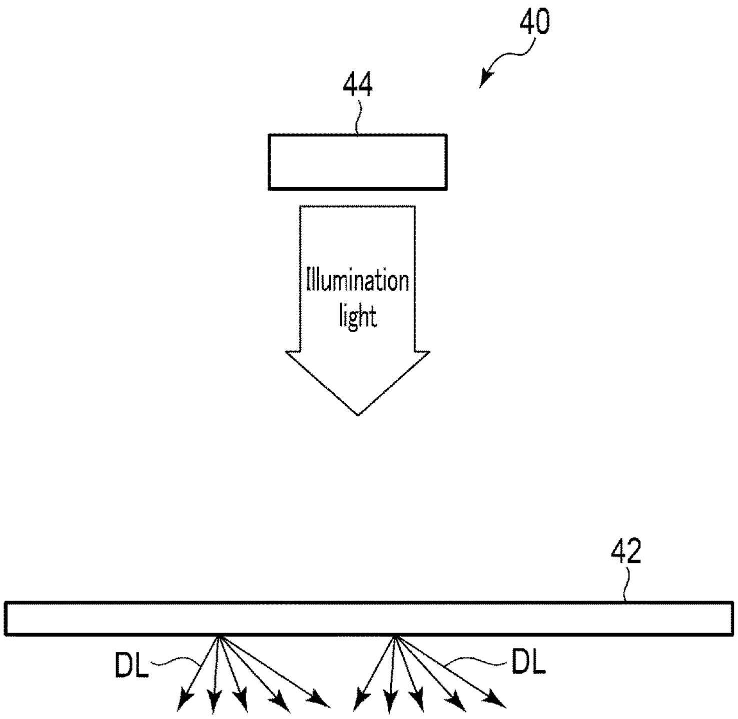
F I G. 11
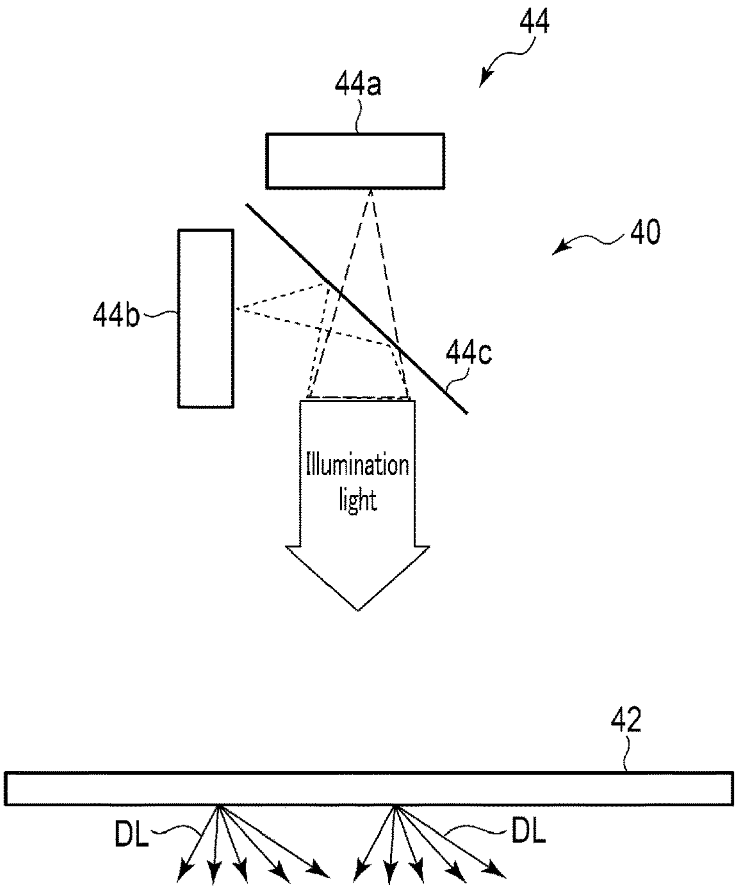
F I G. 12

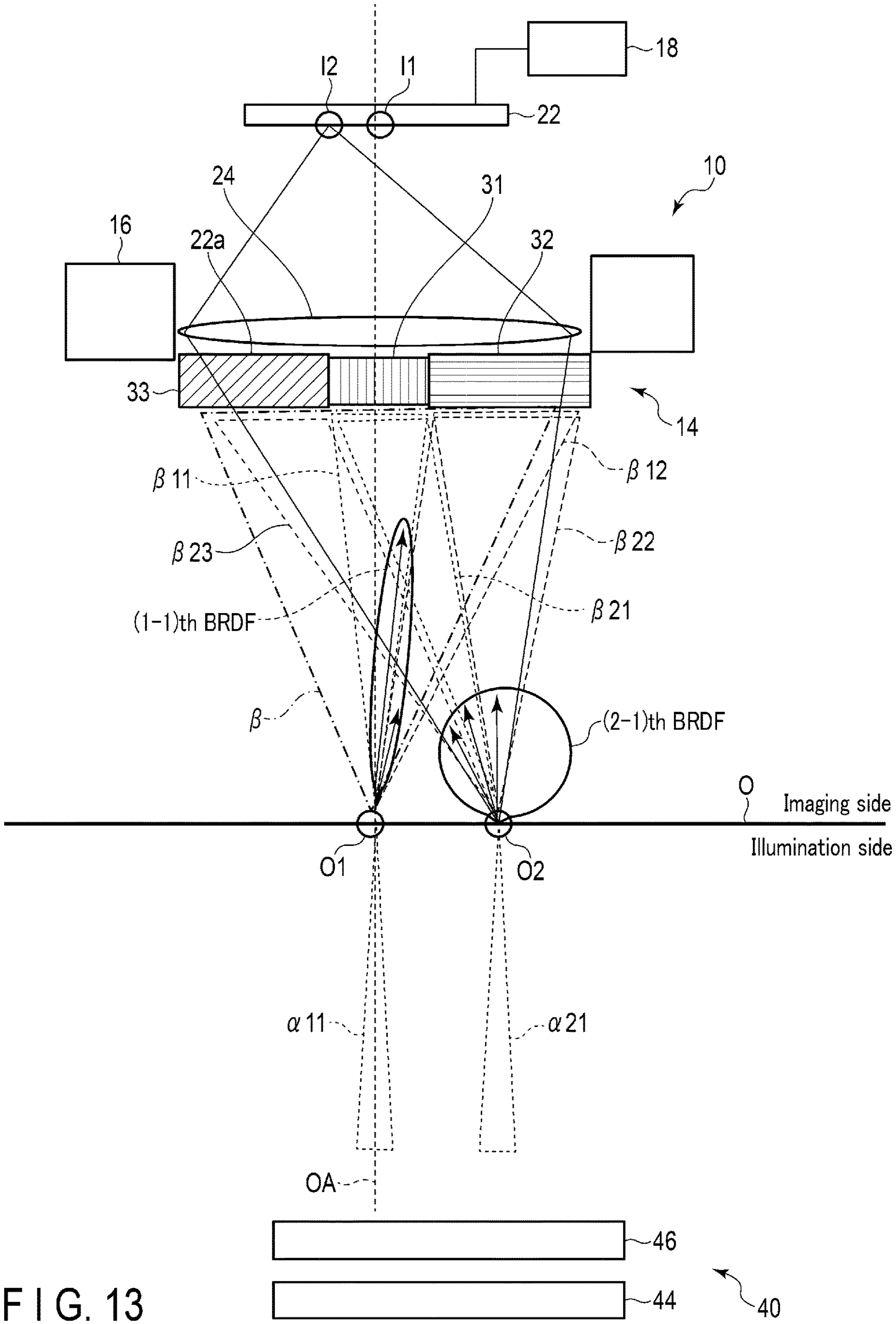
F I G. 13

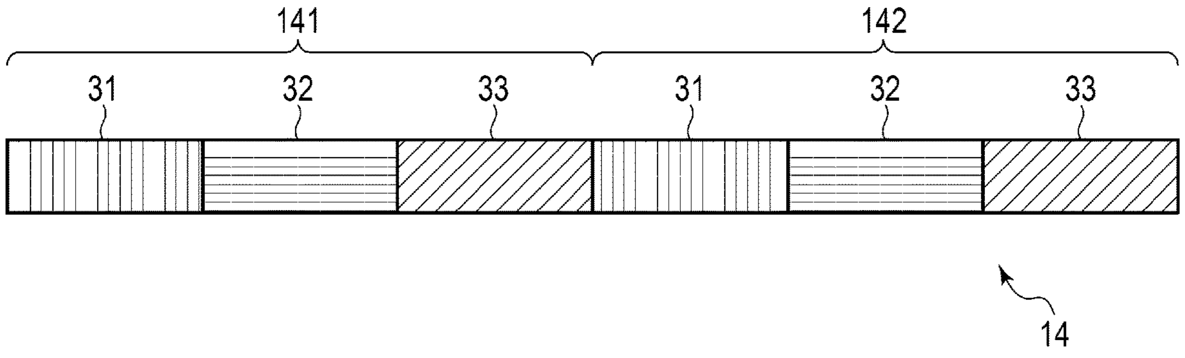
F I G. 14
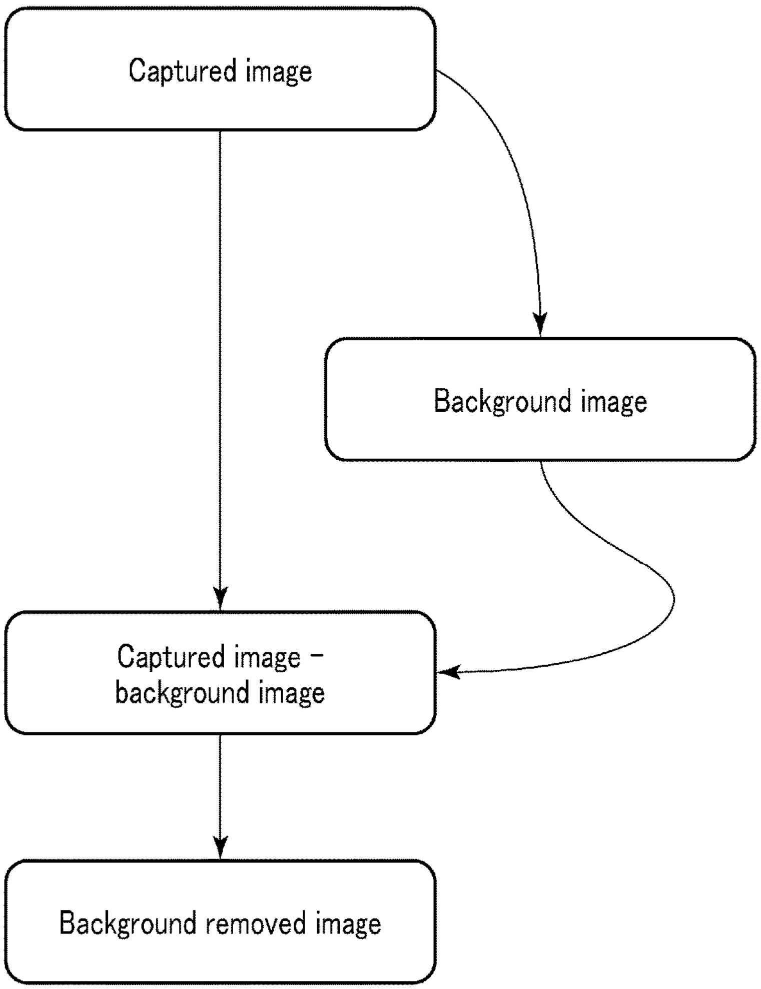
F I G. 15

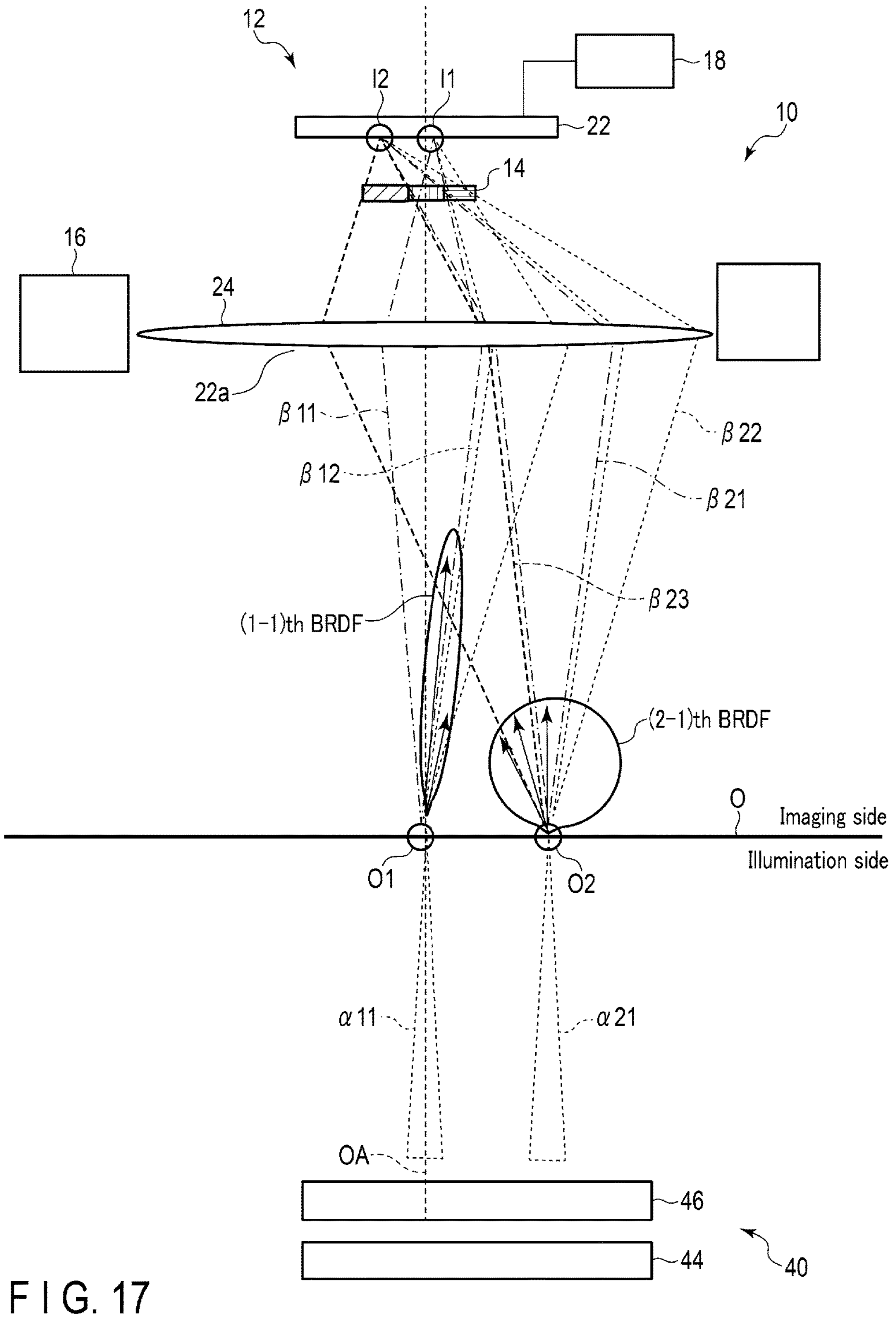
F I G. 17

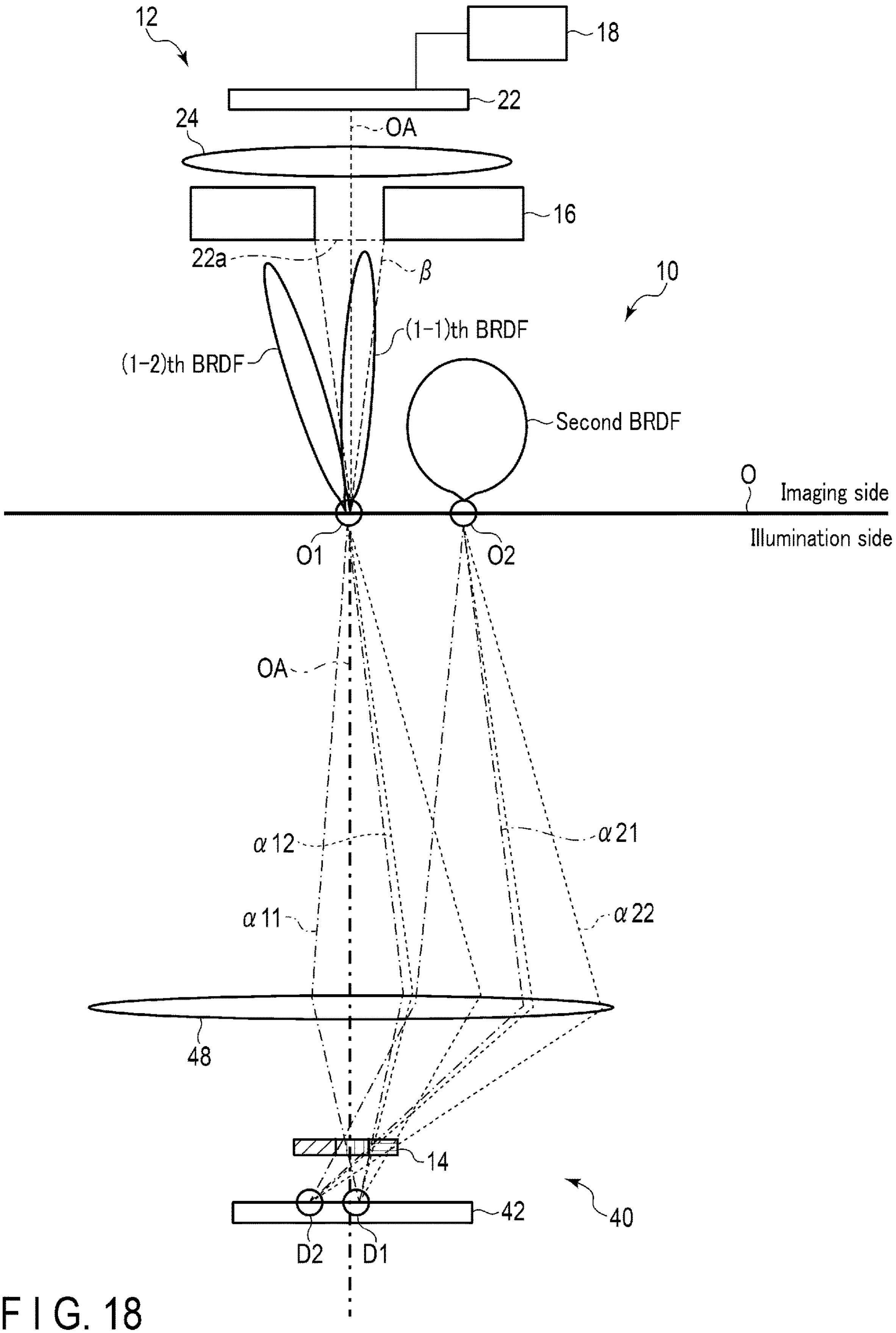
F I G. 18

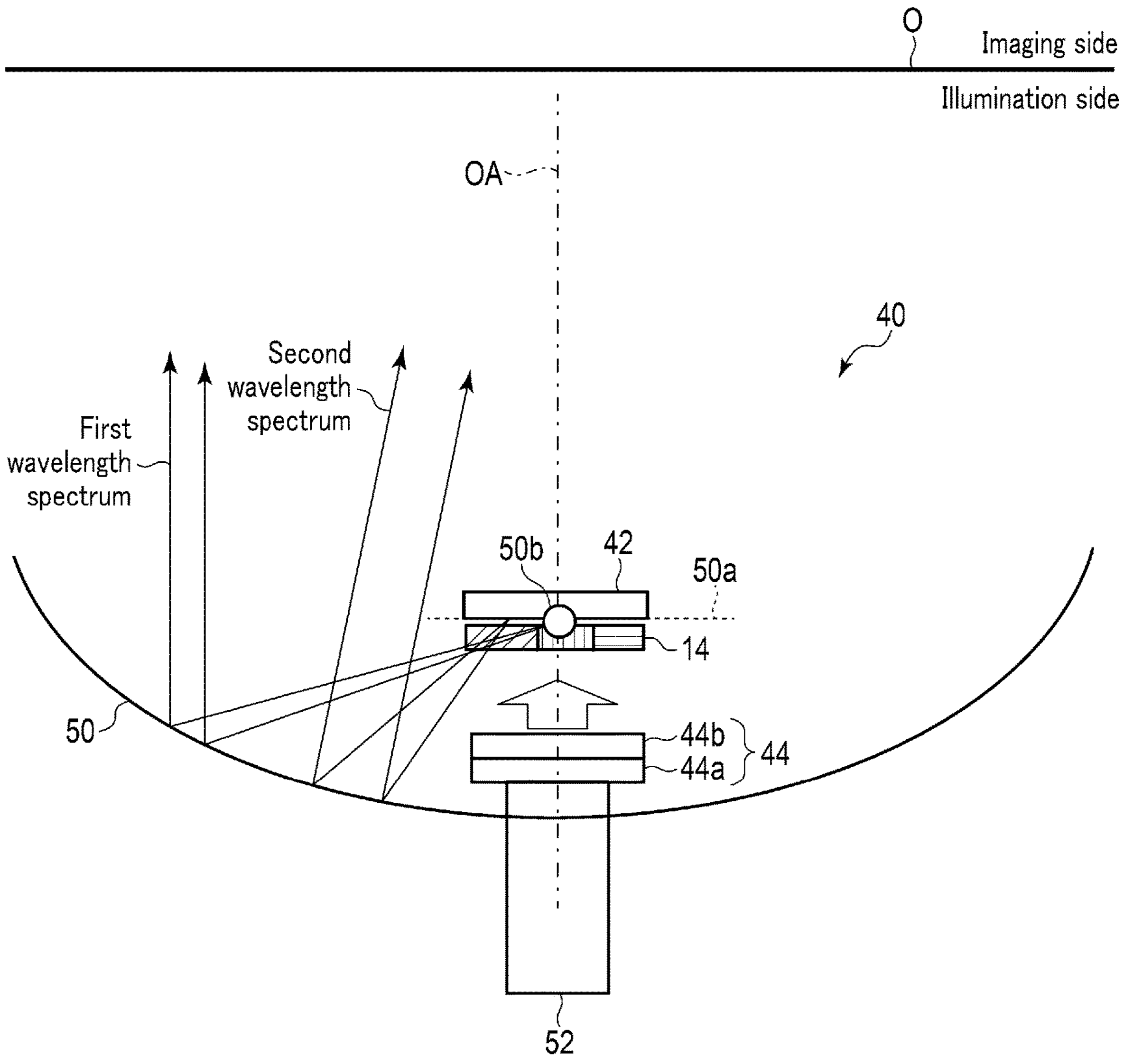
F I G. 19

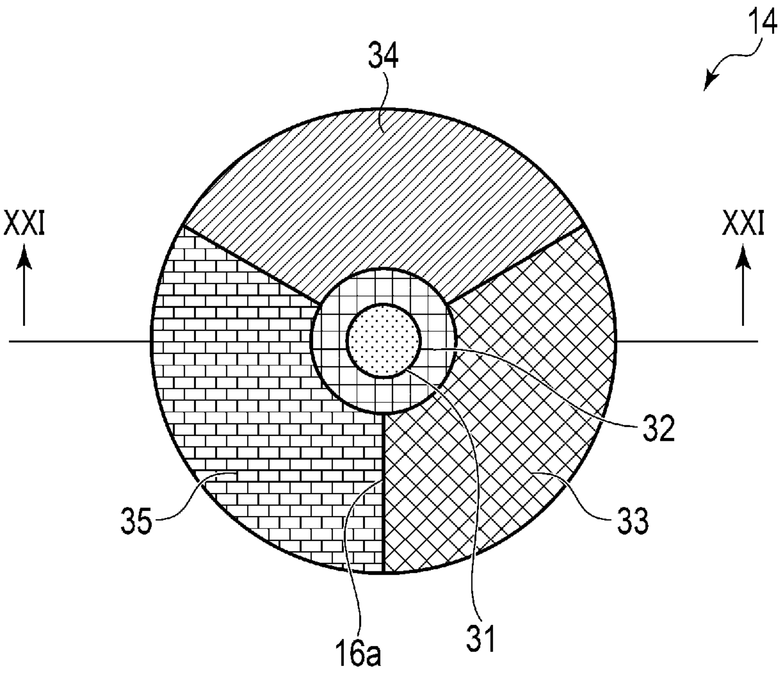
F I G. 20
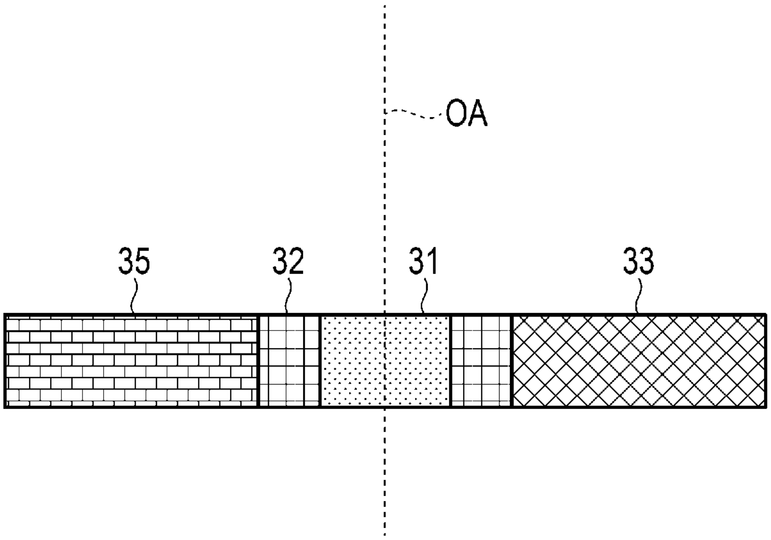
F I G. 21

OPTICAL INSPECTION METHOD, NON-TRANSITORY STORAGE MEDIUM, AND OPTICAL INSPECTION APPARATUS

CROSS-REFERENCE TO RELATED APPLICATIONS

This application is based upon and claims the benefit of priority from Japanese Patent Application No. 2023-045753, filed Mar. 22, 2023, the entire contents of all of which are incorporated herein by reference.

FIELD

Embodiments described herein relate generally to an optical inspection method, a non-transitory storage medium, and an optical inspection apparatus.

BACKGROUND

In various industries, inspection of an object in a non-contact state is important. As a conventional method, there exists a method in which the color (wavelength spectrum) of spectrally divided light is made to correspond to the direction of the light beam in a one-to-one correspondence, the direction of the light beam is identified by specifying the color, and information on an object surface or in an object is acquired.

BRIEF DESCRIPTION OF THE DRAWINGS

FIG. 1 is a schematic view showing an optical inspection apparatus according to the first embodiment.

FIG. 2 is a schematic view showing a first color vector and a second color vector on a color coordinate space on which color coordinates corresponding to a first color channel, a second color channel, and a third color channel are defined as B, R, and G.

FIG. 3 is a flowchart for acquiring information on the object surface of an object using the optical inspection apparatus according to the first embodiment.

FIG. 4 is a schematic view showing, on a color coordinate space according to the first modification of the first embodiment, the direction of a color vector to a first object point in a reference image obtained by capturing a standard object by an imaging portion as a first reference direction and the direction of a color vector to a second object point as a second reference direction and also showing the color vector of the captured image.

FIG. 6 is a schematic view showing an optical inspection apparatus according to the second modification of the first embodiment.

FIG. 10 is a schematic view schematically showing an illumination side and an imaging side with respect to the object surface of the optical inspection apparatus shown in FIG. 9.

FIG. 11 is a schematic view showing the illumination unit of an optical inspection apparatus according to the first modification of the second embodiment.

FIG. 12 is a schematic view showing the illumination unit of an optical inspection apparatus according to the second modification of the second embodiment.

FIG. 13 is a schematic view showing an optical inspection apparatus according to the third embodiment.

FIG. 14 is a schematic view showing the wavelength selection portion of an optical inspection apparatus according to the first modification of the third embodiment.

FIG. 15 is a flowchart showing a minute defect image extraction method of the optical inspection apparatus according to the first modification of the third embodiment.

FIG. 17 is a schematic view showing an optical inspection apparatus according to the second modification of the third embodiment.

FIG. 18 is a schematic view showing an optical inspection apparatus according to the fourth embodiment.

FIG. 19 is a schematic view showing the illumination unit of an optical inspection apparatus according to the first modification of the fourth embodiment.

FIG. 20 is a schematic view showing the wavelength selection portion of an optical inspection apparatus according to the second modification of the fourth embodiment.

FIG. 21 is a sectional view of the wavelength selection portion shown in FIG. 20 taken along a line XXI-XXI.

DETAILED DESCRIPTION

Figure 5:
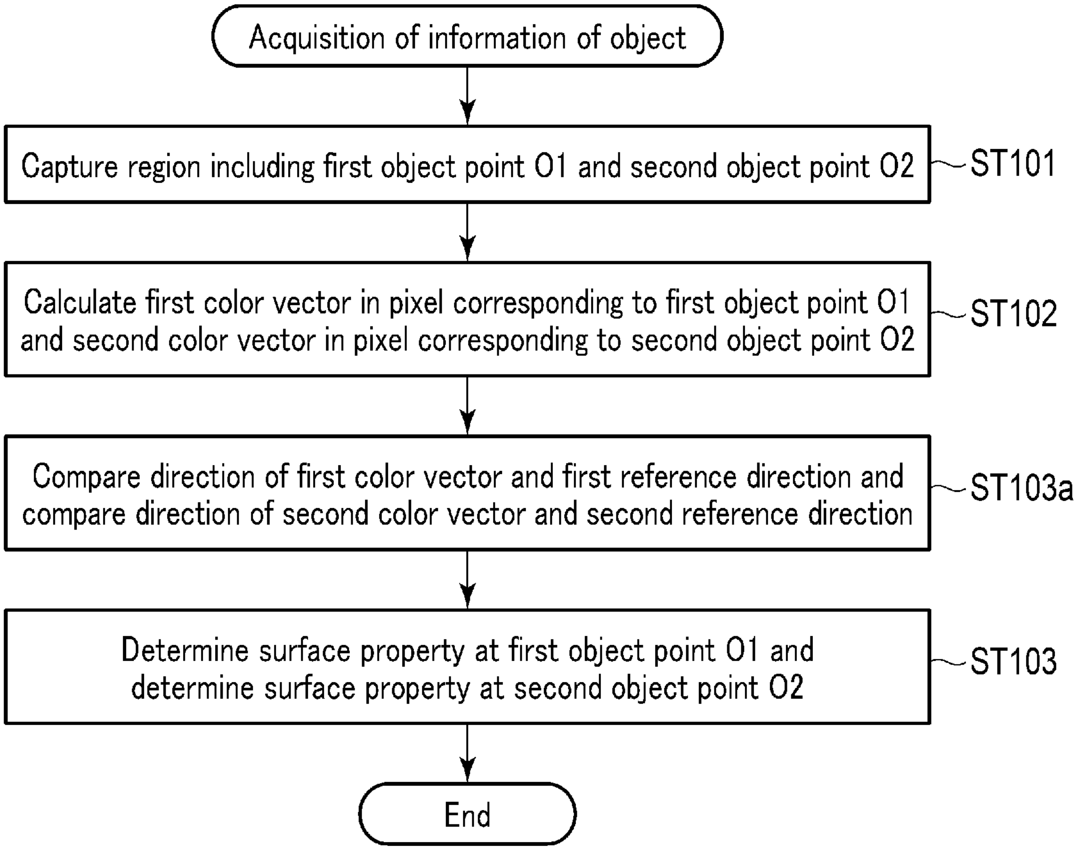
FIG. 5 is a flowchart for acquiring information on the object surface of an object using an optical inspection apparatus according to the first modification of the first embodiment.

It is an object of an embodiment to provide an optical inspection method, a non-transitory storage medium storing an optical inspection program, and an optical inspection apparatus capable of acquiring information of an object on an object surface or in the object even in a case where light is scattered, diffused, or diffracted in various directions in the object.

According to the embodiment, an optical inspection method including: causing a wavelength selection portion to selectively pass light components including at least two different wavelength spectra from an object point and causing an imaging portion including at least two color channels configured to receive the light components of the wavelength spectra to capture the object point; defining the light components of the at least two different wavelength spectra as signal vectors having different directions based on light reception data in the at least two color channels for the object point; and estimating spread of a direction distribution of light at the object point based on the directions of the signal vectors.

According to the embodiment, an optical inspection method including: passing illumination light through a wavelength selection portion and irradiating an object point with the illumination light, wherein: the illumination light has at least two different first and second wavelength spectra, and the wavelength selection portion includes: a first wavelength selection region that is configured to shield a light component of at least one wavelength not included in a light component of the first wavelength spectrum, and a second wavelength selection region that is configured to shield a light component of at least one wavelength not included in a light component of the second wavelength spectrum; causing the imaging portion including at least two color channels configured to receive the light component of the first wavelength spectrum and the light component of the second wavelength spectrum to capture the object point, such that: with an object surface as a boundary including the object point captured as an image by the light that has passed through an imaging opening of the imaging portion, a side closer to the imaging portion is defined as an imaging side and a side far from the imaging portion is defined as an illumination side; with respect to the object point, a first illumination side solid angle corresponding to the first wavelength selection region and a second illumination side solid angle corresponding to the second wavelength selection region are defined; with respect to the object point, an imaging opening solid angle corresponding to the imaging opening is defined; one of the first illumination side solid angle and the second illumination side solid angle does not have a common region to the imaging opening solid angle; defining the light component of the first wavelength spectrum and the light component of the second wavelength spectrum as signal vectors having different directions based on light reception data by the at least two color channels for the object point; and estimating spread of a direction distribution of the light at the object point based on the directions of the signal vectors.

According to the embodiment, a non-transitory storage medium storing an optical inspection program configured to cause a computer to execute: causing a wavelength selection portion to selectively pass light components including at least two different wavelength spectra from an object point and causing an imaging portion including at least two color channels configured to receive the light components of the wavelength spectra to capture the object point; defining the light components of the at least two different wavelength spectra as signal vectors having different directions based on light reception data in the at least two color channels for the object point; and estimating spread of a direction distribution of light at the object point based on the directions of the signal vectors.

According to the embodiment, a non-transitory storage medium storing an optical inspection program is configured to cause a computer to execute: passing the illumination light through a wavelength selection portion and irradiating an object point with the illumination light, wherein the illumination light has at least two different first and second wavelength spectra, and the wavelength selection portion includes: a first wavelength selection region that is configured to shield a light component of at least one wavelength not included in a light component of the first wavelength spectrum, and a second wavelength selection region that is configured to shield a light component of at least one wavelength not included in a light component of the second wavelength spectrum; causing the imaging portion including at least two color channels configured to receive the light component of the first wavelength spectrum and the light component of the second wavelength spectrum to capture the object point, such that: with an object surface as a boundary including the object point captured as an image by the light that has passed through an imaging opening of the imaging portion, a side closer to the imaging portion is defined as an imaging side and a side far from the imaging portion is defined as an illumination side; with respect to the object point, a first illumination side solid angle corresponding to the first wavelength selection region and a second illumination side solid angle corresponding to the second wavelength selection region are defined; with respect to the object point, an imaging opening solid angle corresponding to the imaging opening is defined; one of the first illumination side solid angle and the second illumination side solid angle does not have a common region to the imaging opening solid angle; defining the light component of the first wavelength spectrum and the light component of the second wavelength spectrum as signal vectors having different directions based on light reception data by the at least two color channels for the object point; and estimating spread of a direction distribution of the light at the object point based on the directions of the signal vectors.

According to the embodiment, an optical inspection apparatus comprises one or more processor configured to: cause a wavelength selection portion to selectively pass light components including at least two different wavelength spectra from an object point and cause an imaging portion including at least two color channels configured to receive the light components of the wavelength spectra to capture the object point; define the light components of the at least two different wavelength spectra as signal vectors having different directions based on light reception data in the at least two color channels for the object point; and estimate spread of a direction distribution of light at the object point based on the directions of the signal vectors.

According to the embodiment, an optical inspection apparatus includes: a wavelength selection portion, an imaging portion, and a shielding portion. The a wavelength selection portion includes: a first wavelength selection region that is configured to shield a light component of at least one wavelength not included in a light component of a first wavelength spectrum in illumination light including at least two different wavelength spectra, and a second wavelength selection region that is configured to shield a light component of at least one wavelength not included in a light component of a second wavelength spectrum in illumination light including at least two different wavelength spectra. The wavelength selection portion is configured to pass the illumination light toward an object point. The imaging portion includes an image sensor including color channels configured to receive the light component of the first wavelength spectrum and the light component of the second wavelength spectrum in reflected light from the object point as signal vectors having different directions. The shielding portion is configured to define an imaging opening that is configured to receive the light from the object point in the image sensor. With an object surface as a boundary including the object point captured as an image by the light that has passed through the imaging opening, a side closer to the imaging portion is defined as an imaging side, and a side far from the imaging portion is defined as an illumination side. With respect to the object point, a first illumination side solid angle corresponding to the first wavelength selection region and a second illumination side solid angle corresponding to the second wavelength selection region are defined. With respect to the object point, an imaging opening solid angle corresponding to the imaging opening is defined. The shielding portion defines the imaging opening such that one of the first illumination side solid angle and the second illumination side solid angle does not have a common region to the imaging opening solid angle.

According to the embodiment, an optical inspection apparatus includes: a wavelength selection portion, an image sensor, and a shielding portion. The wavelength selection portion includes: a first wavelength selection region that is configured to shield a light component of at least one wavelength not included in a light component of a first wavelength spectrum in illumination light including at least two different wavelength spectra, and a second wavelength selection region that is configured to shield a light component of at least one wavelength not included in a light component of a second wavelength spectrum in illumination light including at least two different wavelength spectra. The wavelength selection portion is configured to pass the illumination light toward an object point. The image sensor includes, in each pixel, a first color channel configured to receive the light component of the first wavelength spectrum, and a second color channel configured to receive the light component of the second wavelength spectrum from the object point The image sensor is configured to receive the light component of the first wavelength spectrum and the light component of the second wavelength spectrum as different signals. The shielding portion is configured to set an imaging opening for light to be received by the image sensor such that in a pixel of the image sensor corresponding to the object point, a magnitude relationship of a pixel value between the first color channel and the second color channel changes in accordance with spread of a direction distribution of light at the object point.

According to the embodiment, an optical inspection apparatus includes: a wavelength selection portion, and an image sensor. The wavelength selection portion includes: first, second and third wavelength selection regions. The first wavelength selection region is configured to pass a light component of a first wavelength spectrum and is configured to shield a light component having at least one wavelength not included in the wavelength spectrum; the second wavelength selection region is configured to pass a light component of a second wavelength spectrum and is configured to shield a light component having at least one wavelength not included in the wavelength spectrum; and, the third wavelength selection region is configured to pass a light component of a third wavelength spectrum and is configured to shield a light component having at least one wavelength not included in the wavelength spectrum, when an object surface including an object point is irradiated with illumination light including the light component of the first wavelength spectrum, the light component of the second wavelength spectrum different from the light component of the first wavelength spectrum, and the light component of the third wavelength spectrum different from the light component of the first wavelength spectrum and the light component of the second wavelength spectrum. The image sensor includes, in each pixel, a first color channel configured to receive the light component of the first wavelength spectrum, a second color channel configured to receive the light component of the second wavelength spectrum from the object point, and a third color channel configured to receive the light component of the third wavelength spectrum. The image sensor is configured to receive the light component of the first wavelength spectrum, the light component of the second wavelength spectrum, and the light component of the third wavelength spectrum as different signal vectors. The wavelength selection portion and the image sensor are arranged such that in a pixel of the image sensor corresponding to the object point, a magnitude relationship of a pixel value between the first color channel, the second color channel, and the third color channel changes in accordance with spread of a direction distribution of light at the object point.

Embodiments will now be described with reference to the accompanying drawings. The drawings are schematic or conceptual, and the relationship between the thickness and the width of each part, the size ratio between parts, and the like do not always match the reality. Also, even the same portions may be illustrated in different sizes or ratios depending on the drawing. In the present specification and the drawings, the same elements as described in already explained drawings are denoted by the same reference numerals, and a detailed description thereof will appropriately be omitted.

In this specification, light is a kind of electromagnetic wave, and includes gamma rays, X rays, ultraviolet rays, visible light, infrared rays, radio waves, and the like. In this embodiment, it is assumed that the light is visible light and, for example, the wavelength falls in a region of 400 nm to 750 nm.

First Embodiment

An optical inspection apparatus 10 according to the first embodiment will be described below with reference to FIGS. 1 to 3.

FIG. 1 is a schematic sectional view of the optical inspection apparatus 10 according to this embodiment. The optical inspection apparatus 10 according to this embodiment includes an imaging portion 12, a wavelength selection portion 14, a shielding portion 16, and a processing unit (one or more processor) 18. The imaging portion 12 includes an image sensor 22. The imaging portion 12 may include at least one of the wavelength selection portion 14 and the shielding portion 16.

A point on the surface of an object O or in the object O is called an object point. Hereinafter, the object point is located on the surface of the object O unless it is specifically stated otherwise.

In this specification, "capturing an object point with light" means that light from an object point forms an image at an image point on the image sensor 22 of the imaging portion 12, and the light is received by the pixels of the image sensor 22. However, the image sensor 22 may be either an area sensor or a line sensor, and any device capable of converting light into a light receiving signal can be used. The light receiving signal may simply be referred to as a signal, a signal value, or a pixel value. Also, "capturing an object point with light" is sometimes expressed as "capturing light".

An imaging optical system such as an imaging lens in the imaging portion 12 is not illustrated. The imaging portion 12 forms an image of light from each of object points O1 and O2 at an image point on the image sensor 22 along an optical axis OA. Assuming light emitted from the imaging portion 12 along the optical axis OA, "on the optical axis OA of the imaging portion 12" means "on a path through which the light passes". Hence, if light is reflected by a mirror or a beam splitter, "along the optical axis OA" means "on a path along the light beam path". In particular, if light is branched to two light beams by a beam splitter (not shown), "on the optical axis OA" means both the two branched paths.

In this specification, a state in which the object points O1 and O2 can be captured means that image points corresponding to the object points O1 and O2 are located on the image sensor 22 or near the image sensor 22 of the imaging portion 12. Here, if an image point exists on the image sensor 22, a clear image is captured. If the image point is apart from the image sensor 22, a blur image is captured.

The wavelength selection portion 14 includes a first wavelength selection region 31 and a second wavelength selection region 32. The first wavelength selection region 31 and the second wavelength selection region 32 pass light components of wavelength spectra different from each other. Here, "passing light" means causing light from an object point of an object that is an imaging target to reach the image sensor 22 of the imaging portion 12 such that the light can be captured by the image sensor 22. On the other hand, light that does not pass through the wavelength selection portion 14 is shielded by the wavelength selection portion 14. Here, "shielding light" means setting light from an object in a state in which it cannot be captured by the image sensor 22 of the imaging portion 12.

A wavelength spectrum that passes through the first wavelength selection region 31 of the wavelength selection portion 14 is defined as a first wavelength spectrum, and a wavelength spectrum that passes through the second wavelength selection region 32 is defined as a second wavelength spectrum. Here, for example, the first wavelength spectrum has a significant light intensity within the wavelength range of 400 nm to 500 nm, and this is called blue (B) light. The peak wavelength of blue light is located near 450 nm. Also, for example, the second wavelength spectrum has a significant light intensity within the wavelength range of 600 nm to 700 nm, and this is called red (R) light. The peak wavelength of red light is located near 650 nm. However, the wavelength spectra are not limited to these, and arbitrary wavelength spectra are usable. For example, a single wavelength may be used. The wavelength selection regions 31 and 32 can have any shape. For example, the wavelength selection regions 31 and 32 may be concentric circles or stripes, or may have a rotationally symmetric shape, a polygonal shape, a radial shape, or an elliptical shape. The wavelength selection regions 31 and 32 shown in FIG. 1 each have, for example, a substantially rectangular shape, and are arranged in a direction crossing the optical axis OA. That is, the optical axis OA and the wavelength selection regions 31 and 32 intersect each other. In FIG. 1, the second wavelength selection region 32 intersects the optical axis OA.

The shielding portion 16 is provided, for example, outside the wavelength selection portion 14. The shielding portion 16 shields light that can be captured without passing through the wavelength selection portion 14. The shielding portion 16 shields at least light components having the first wavelength spectrum and the second wavelength spectrum. That is, the shielding portion 16 shields a wavelength range in which a wavelength spectrum obtained by superimposing the first wavelength spectrum and the second wavelength spectrum has a significant light intensity.

The complementary color of a certain wavelength spectrum has a significant light intensity in a wavelength region that does not include a wavelength range in which the wavelength spectrum has a significant light intensity.

The image sensor 22 of the imaging portion 12 acquires a color image, and the processing unit 18 processes the color image captured by the image sensor 22. Here, the image sensor 22 has, in each pixel, two color channel components capable of receiving at least the first wavelength spectrum and the second wavelength spectrum as different signal vectors. These color channels are defined as a first color channel (B channel) and a second color channel (R channel), respectively. The first color channel receives a signal strong to blue light, and the second color channel receives a signal strong to red light.

In each pixel of an image, a vector having a pixel value of each color channel is called a color vector or a signal vector. For example, if the pixel values of the first color channel, the second color channel, and the third color channel are b, r, and g, respectively, in a certain pixel, a color vector or a signal vector can be expressed as (b, r, g). In addition, a coordinate space in which the pixel values of the color channels are plotted on coordinates orthogonal to each other is called a color coordinate space. The number of components of color vectors (signal vectors), that is, the number of dimensions can be any natural number of 2 or more, and may be 2, 3, 4, or more. Particularly, if a hyperspectral camera is used as the image sensor 22 of the imaging portion 12, the number of dimensions is larger than 3.

The processing unit 18 controls the image sensor 22 of the imaging portion 12 and performs processing of executing estimation processing of estimating spread of the direction distribution of light to be described later.

The processing unit 18 is formed by, for example, a computer, and includes one or more processor (processing circuit) and a storage medium. The processor includes one of a CPU (Central Processing Unit), an ASIC (Application Specific Integrated Circuit), a microcomputer, an FPGA (Field Programmable Gate Array), and a DSP (Digital Signal Processor). In addition to a main storage device such as a memory, the storage medium can include a non-transitory auxiliary storage device. As the storage medium, a nonvolatile memory capable of writing and reading as needed, such as an HDD (Hard Disk Drive), an SSD (Solid State Drive), a magnetic disk, an optical disk (a CD ROM, a CD R, a DVD, or the like), a magnetooptical disk (an MO or the like), a semiconductor memory, or the like can be used.

In the processing unit 18, only one processor and one storage medium may be provided, or a plurality of processors and a plurality of storage media may be provided. In the processing unit 18, the processor executes a program and the like stored in the storage medium, thereby performing processing. The program executed by the processor of the processing unit 18 may be stored in a computer (server) connected to the processing unit 18 via a network such as the Internet, or a server in a cloud environment. In this case, the processor downloads the program via the network. The processing unit 18 according to this embodiment, for example, reads out an optical inspection program stored in a non-transitory storage medium to be described later from the non-transitory storage medium and executes it.

In the processing unit 18, image acquisition from the image sensor 22 and various kinds of calculation processing based on the image acquired from the image sensor 22 are executed by the one or more processor and the like, and the storage medium functions as a data storage unit.

In addition, at least part of the processing of the processing unit 18 may be executed by a cloud server constituted in a cloud environment. The infrastructure of the cloud environment is formed by one or more virtual processor such as a virtual CPU and a cloud memory. In an example, image acquisition from the image sensor 22 and various kinds of calculation processing based on the image acquired from the image sensor 22 are executed by the one or more virtual processor, and the cloud memory functions as a data storage unit.

Note that in this embodiment, the processing unit 18 controls the image sensor 22 and performs various kinds of operations for image data obtained from the image sensor 22.

The processing unit 18 discriminates the light of the first wavelength spectrum and the light of the second wavelength spectrum from the received signal strengths (pixel values) of the two color channels in each pixel of the color image acquired by the image sensor 22. Also, the processing unit 18 can identify, based on the pixel value of each color channel, whether the light of the first wavelength spectrum and the light of the second wavelength spectrum are simultaneously captured, or only one of these is captured. That is, the processing unit 18 can identify whether, in each pixel, only the first wavelength spectrum is captured, only the second wavelength spectrum is captured, these are simultaneously captured, or neither is captured.

Based on the above-described configuration, the operation principle of the optical inspection apparatus 10 according to this embodiment will be described.

In FIG. 1, the first object point O1 and the second object point O2 are set on the surface of the object O. However, the first object point O1 and the second object point O2 are not limited to the above in the present embodiment, and the first object point O1 and the second object point O2 may be set in the object O. The first object point O1 and the second object point O2 can be set anywhere on the surface of the object O or in the object O.

The first object point O1 is on a standard surface. A defect such as a minute defect does not exist in the standard surface, and it is substantially a mirror surface. That is, if light enters the standard surface, reflected light mainly includes specular reflection components. However, the standard surface is not limited to the above in the present embodiment, and a surface of any property can be used as the standard surface. On the other hand, a minute uneven defect having a size of several ten μm or less exists at the second object point O2. That is, it is a scale several 10 times or less a wavelength scale (for example, 450 nm or 650 nm). Such a defect is called a minute defect. If light enters a minute defect, the light is generally scattered. Scattering sometimes occurs due to geometrical optical reflection, and sometimes occurs due to diffraction. Here, all phenomena including such diffraction phenomena are called scattering. If the object O is opaque, scattering occurs on the surface of the object O. It can also be said that scattering is a phenomenon that incident light that is one light beam branches to light beams in at least two different directions. On the other hand, if light enters a mirror surface, specular reflection occurs. In the specular reflected light, an incident angle and a reflection angle with respect to a normal direction to the surface equal, and the reflected light is one light beam without branching. Also, if the object O is a transparent body, and a minute defect exists in the transparent body, one light beam that has entered the minute defect branches to at least two light beams due to scattering. On the other hand, light that has entered a transparent body without a minute defect in the object O passes through the transparent body without branching if the refractive index distribution is continuous. If the refractive index distribution is discontinuous, there is generated a component that causes Fresnel reflection on a discontinuous surface and is reflected in a direction reverse to the incident direction with respect to the discontinuous interface. That is, if no minute defect exists, a light beam branches to light beams in two different directions at maximum. However, even if a reflected light component is generated, it advances in a direction reverse to the imaging side, and therefore does not reach the imaging portion 12. Thus, an incident light beam is scattered by a minute defect and branches to light beams (scattered light) in two different directions due to scattering.

The direction distribution of light at an arbitrary object point is called a light beam direction distribution. In particular, the direction dependency of the intensity distribution of reflected light on the surface of the object O can be described by a BRDF (Bidirectional Reflectance Distribution Function). Hereinafter, an object point is located on the surface of the object O, and image capturing by the image sensor 22 is done by light reflected by the surface of the object O, unless it is specifically stated otherwise. Even if an object point exists in the object O, and light passes through the object O and reaches the image sensor 22, the same effects as in the case of reflection are basically expected to be obtained.

The BRDF at the first object point O1 is defined as a first BRDF, and the BRDF at the second object point O2 is defined as a second BRDF. Since the first object point O1 is on the standard surface, and a minute defect exists at the second object point O2, the (angle) distribution is narrower in the first BRDF than in the second BRDF. In other words, the second BRDF has a wider distribution as compared to the first BRDF. Thus, if a minute defect exists, in general, the distribution of the BRDF spreads. However, the distribution of the BRDF is not limited to the above in the present embodiment, and the reverse of the distribution of the BRDF is also possible. The distribution of a BRDF changes depending on at least the presence/absence of a minute defect.

In this embodiment, light reflected at the first object point O1 passes only the first wavelength selection region 31 of the wavelength selection portion 14 because the distribution of the BRDF is narrow. The light reflected at the first object point O1 passes through only the first wavelength selection region 31 and changes to light having the first wavelength spectrum. On the other hand, light reflected from the second object point O2 passes both the first wavelength selection region 31 and the second wavelength selection region 32 of the wavelength selection portion 14 because the distribution of the BRDF is wide. For this reason, the light reflected at the second object point O2 changes to light having a wavelength spectrum obtained by superimposing the first wavelength spectrum that has passed through the first wavelength selection region 31 and the second wavelength spectrum that has passed through the second wavelength selection region 32.

The image sensor 22 of the imaging portion 12 is controlled by the processing unit 18 and captures a region including the first object point O1 and the second object point O2. At this time, in a pixel of the captured image corresponding to the first object point O1, the pixel value of the first color channel that receives the light of the first wavelength spectrum has a value larger than the pixel value of the second color channel that receives the light of the second wavelength spectrum. On the other hand, in a pixel corresponding to the second object point O2, the pixel values of both the first color channel that receives the light of the first wavelength spectrum and the second color channel that receives the light of the second wavelength spectrum have significant values. That is, the processing unit 18 can obtain information about the spread of the distribution of the BRDF based on the ratio of the pixel values of the color channels in each pixel.

The shielding portion 16 shields light that can be captured by the imaging portion 12 without passing through the wavelength selection portion 14. If the shielding portion 16 does not exist, there may exist light that can be received by the first color channel or the second color channel without passing through the wavelength selection portion 14. Then, it is difficult to obtain information about the spread of the distribution of the BRDF based on the ratio of the pixel values of the color channels in each pixel. That is, it can be said that the shielding portion 16 is necessary to obtain information about the spread of the distribution of the BRDF. In other words, because of the existence of the shielding portion 16, the processing unit 18 can perform accurate estimation of the spread of the distribution of the BRDF regardless of the environment.

In an image captured by the image sensor 22 of the imaging portion 12, a color vector in a pixel corresponding to the first object point O1 is defined as a first color vector, and a color vector in a pixel corresponding to the second object point O2 is defined as a second color vector. As shown in FIG. 2, color coordinates corresponding to the first color channel, the second color channel, and the third color channel are defined as B, R, and G, thereby setting a color coordinate space. Each color vector has, as a magnitude, the pixel value of the first color channel, the pixel value of the second color channel, and the pixel value of the third color channel in a pixel. In FIG. 2, the directions of the first color vector and the second color vector are different because the distributions of BRDFs are different. That is, it can be said that the processing unit 18 can identify the spread of the distribution of the BRDF at each of the object points O1 and O2 based on the direction of the color vector.

That is, the light components of different wavelength spectrums that pass through the first wavelength selection region 31 and the second wavelength selection region 32 become two signal vectors (color vectors) having different directions. The signal vector of the light having the wavelength spectrum that passes through the first wavelength selection region 31 is defined as a first basic color vector. The signal vector of the light having the wavelength spectrum that passes through the second wavelength selection region 32 is defined as a second basic color vector.

The color vector of an image captured by the image sensor 22 of the imaging portion 12 is the sum (linear combination) of vectors obtained by multiplying the basic color vectors (the first basic color vector and the second basic color vector) by a coefficient. Based on the mathematical property of linear independence of vectors, it can be indicated that the directions of the first basic color vector, the second basic color vector, and the linear combination vector obtained by multiplying these vectors by a coefficient that is not 0 and adding them are different from the other. Hence, the processing unit 18 can identify, based on the directions of the color vectors, whether light from each of the object points O1 and O2 has passed through the first wavelength selection region 31 or the second wavelength selection region 32, or both of these.

Here, the linear independence of the color vectors (signal vectors) can be used because the signal vector of the captured image can be formed only by the light components of the first wavelength spectrum and the second wavelength spectrum, which pass through the wavelength selection portion 14 by the shielding portion 16. On the other hand, if the shielding portion 16 is absent, even light that reaches the image sensor 22 of the imaging portion 12 without passing through the wavelength selection portion 14 may be captured by the image sensor 22 of the imaging portion 12. That is, since the shielding portion 16 exists, it is possible to conclude that light captured by the image sensor 22 is light that has passed through the wavelength selection portion 14. On the other hand, if the shielding portion 16 is absent, even if the directions of color vectors are different, it is difficult to estimate the path the light captured by the image sensor 22 has passed through. However, even if the shield is not perfect, the accuracy of estimation of the path the light captured by the image sensor 22 has passed through can be raised by reducing light that is captured by the image sensor 22 without passing through the wavelength selection portion 14.

Also, if the directions of the two color vectors (signal vectors) of the light components that pass through the first wavelength selection region 31 and the second wavelength selection region 32 are different, the first wavelength spectrum and the second wavelength spectrum may have overlapping regions. This is because linear independence can mathematically be applied to a vector obtained by linearly combining two vectors of different directions. That is, if the directions of the first basic color vector and the second basic color vector are different from each other, the direction of the vector obtained by multiplying these vectors by a coefficient that is not 0 and linearly combining them is different from those of the basic color vectors. Hence, the processing unit 18 can identify the light of the first wavelength spectrum, the light of the second wavelength spectrum, and the light obtained by superimposing these based on the difference between the directions of the color vectors. For this reason, the wavelength spectra of the light components that pass through the wavelength selection regions 31 and 32 may overlap, and various regions can be applied as the wavelength selection regions 31 and 32.

Thus, for light components having at least two different first and second wavelength spectra, the first wavelength selection region 31 shields a light component of at least one wavelength, which is not included in the light of the first wavelength spectrum, and the second wavelength selection region shields a light component of at least one wavelength, which is not included in the light of the second wavelength spectrum.

Information acquisition processing for an object using the processing unit 18 of the optical inspection apparatus 10 according to this embodiment is performed as shown in FIG. 3. First, the processing unit 18 causes the image sensor 22 to capture a region including the first object point O1 and the second object point O2 through the wavelength selection portion 14 while appropriately shielding light by the shielding portion 16, thereby acquiring image data (step ST101). The processing unit 18 processes the acquired image data. Based on the pixel value of each color channel of the acquired image data, the processing unit 18 calculates the first color vector in a pixel corresponding to the first object point O1, and calculates the second color vector in a pixel corresponding to the second object point O2 (step ST102). The processing unit 18 then identifies the spread of the distribution of the first BRDF at the first object point O1 and the spread of the distribution of the second BRDF at the second object point O2. That is, the processing unit 18 determines the surface property at the first object point O1 and the surface property at the second object point O2 (step ST103).

As described above, by the optical inspection apparatus 10 according to this embodiment, the spread of the distribution of the BRDF can be identified based on the direction of the color vector. This is because "if the imaging portion 12 configured to shield light that does not pass through the wavelength selection portion 14 captures the object points O1 and O2 using the light component of at least one wavelength spectrum of the light components of two wavelength spectra that pass through at least two different wavelength selection regions 31 and 32 of the wavelength selection portion 14, an image captured by color channels that receive the light components of the two different wavelength spectra as signal vectors having different directions can be acquired".

The optical inspection method according to this embodiment includes causing the wavelength selection portion 14 to selectively pass the light components including at least two different wavelength spectra from the object points O1 and O2 and causing the imaging portion 12 including at least two color channels capable of receiving the light components of the wavelength spectra to capture the object points O1 and O2, defining the light components of the at least two different wavelength spectra as signal vectors having different directions based on light reception data in the at least two color channels for the object points O1 and O2, and estimating spread of the direction distribution of light at each of the object points O1 and O2 based on the directions of the signal vectors. An optical inspection program according to this embodiment causes a computer to execute processing of the above-described optical inspection method.

Hence, by using the optical inspection method or the optical inspection program, the spread of the distribution of the BRDF at each of the object points O1 and O2 can be identified, and the surface property at each of the object points O1 and O2 can be determined.

The signal vector is a vector having, as an end point, a point on a color coordinate space on which the pixel values of the at least two color channels are plotted on coordinates orthogonal to each other.

As described above, according to this embodiment, it is possible to provide an optical inspection method, a non-transitory storage medium storing an optical inspection program, and the optical inspection apparatus 10 capable of acquiring information of the object O even in a case where light is scattered, diffused, or diffracted in various directions in the object O.

First Modification

The first modification of the first embodiment of the optical inspection apparatus 10 will be described with reference to FIGS. 4 and 5.

A standard object (not shown) has a surface made of only a standard surface without a minute defect. An image obtained by capturing the standard object by the image sensor 22 of the imaging portion 12 is a reference image. As shown in FIG. 4, the direction of the color vector for the first object point O1 on the reference image is defined as a first reference direction, and this is stored in the storage medium of the processing unit 18 in advance. Similarly, the direction of the color vector for the second object point O2 is defined as a second reference direction, and this is stored in the storage medium of the processing unit 18 in advance.

The processing unit 18 determines whether the first reference direction and the direction of the captured first color vector (see FIG. 2) substantially match in consideration of an error. Similarly, the processing unit 18 determines whether the second reference direction and the direction of the captured second color vector (see FIG. 2) substantially match in consideration of an error. If the direction of the first color vector substantially matches the first reference direction, it can be said that the first object point O1 is on the standard surface. Similarly, if the direction of the second color vector substantially matches the second reference direction, it can be said that the second object point O2 is on the standard surface. Alternatively, if the direction of the color vector is different from the reference direction at any one of the first object point O1 and the second object point O2, the processing unit 18 can find that the distribution of the BRDF is different from that on the standard surface. In other words, the processing unit 18 can find that the spread of the direction distribution of light is different from that on the standard surface. Hence, the processing unit 18 can estimate that a minute defect exists at the object point.

Similarly, if color vectors corresponding to various BRDFs are stored as reference directions in the storage medium of the processing unit 18 in advance, the processing unit 18 can estimate the spread of the BRDF at each of the object points O1 and O2 by collating the direction of a captured color vector with each reference direction. The BRDF largely changes depending on the type of a minute defect. Hence, the processing unit 18 can estimate the type of a minute defect by identifying the difference of the BRDF.

Information acquisition processing for an object using the processing unit 18 of the optical inspection apparatus 10 according to this embodiment is performed as shown in FIG. 5. First, the processing unit 18 causes the image sensor 22 to capture a region including the first object point O1 and the second object point O2 through the wavelength selection portion 14 while appropriately shielding light by the shielding portion 16, thereby acquiring image data (step ST101). The processing unit 18 processes the acquired image data. Based on the pixel value of each color channel of the acquired image data, the processing unit 18 calculates the first color vector in a pixel corresponding to the first object point O1, and calculates the second color vector in a pixel corresponding to the second object point O2 (step ST102). The processing unit 18 compares the direction of the first color vector in a pixel corresponding to the first object point O1 with the first reference direction, and compares the direction of the second color vector in a pixel corresponding to the second object point O2 with the second reference direction (step ST103*a*). The processing unit 18 determines the surface property at the first object point O1, and determines the surface property at the second object point O2 (step ST103).

Hence, in the optical inspection method according to this embodiment, the estimating includes collating a captured image by the light reception data with a reference image and estimating the spread of the direction distribution of light at each of the object points O1 and O2.

Hence, by using the optical inspection method, the spread of the distribution of the BRDF at each of the object points O1 and O2 can be estimated, and the surface property at each of the object points O1 and O2 can be determined.

Second Modification

The second modification of the first embodiment of the optical inspection apparatus 10 will be described with reference to FIG. 6.

As shown in FIG. 6, the shielding portion 16 may arrange a wavelength shielding region 16*a* (at the boundary) between the first wavelength selection region 31 and the second wavelength selection region 32 of the wavelength selection portion 14. In the second modification, the optical axis OA is located at the boundary between the second wavelength selection region 32 of the wavelength selection portion 14 and the wavelength shielding region 16*a* of the shielding portion 16. The wavelength shielding region 16*a* functions like the shielding portion 16. That is, the wavelength shielding region 16*a* of the shielding portion 16 prevents light components of all wavelength spectra including the light component of the first wavelength spectrum and the light component of the second wavelength spectrum from passing through the wavelength selection portion 14. The first object point O1 is on the standard surface, and a minute defect exists at the second object point O2.

By the wavelength shielding region 16*a* according to the second modification, for example, light from the first object point O1 can be prevented from simultaneously passing through the first wavelength selection region 31 and the second wavelength selection region 32.

In a case where the wavelength shielding region **16*a* is not arranged, if light from the first object point O1 passes through the boundary (see FIG. 1) between the first wavelength selection region 31 and the second wavelength selection region 32, a color vector for this is the same as that for the second object point O2. For this reason, the spread of the distribution of the BRDF at the first object point O1 and the spread of the distribution of the BRDF at the second object point O2 are estimated as the same. On the other hand, if the wavelength shielding region 16*a* is appropriately provided, light from the first object point O1 can be made to pass one of the first wavelength selection region 31 and the second wavelength selection region 32. That is, if the wavelength shielding region 16*a* is provided, the optical inspection apparatus 10 can reliably estimate the difference of the distribution of the BRDF between the first object point O1 and the second object point O2 by the processing unit 18**.

Third Modification

The third modification of the first embodiment of the optical inspection apparatus 10 will be described with reference to FIGS. 7 and 8.

Figure 7:
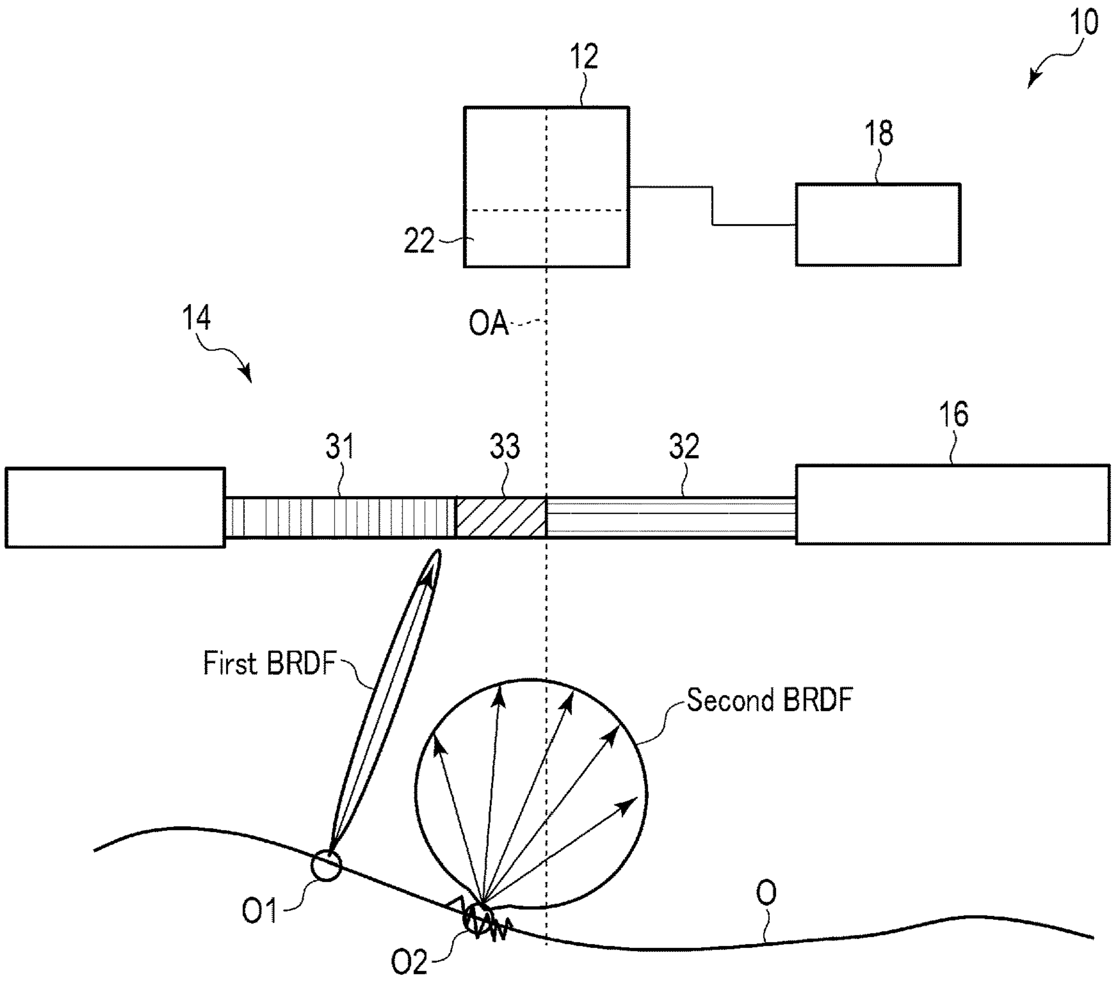
FIG. 7 is a schematic view showing an optical inspection apparatus according to the third modification of the first embodiment.
Figure 8:
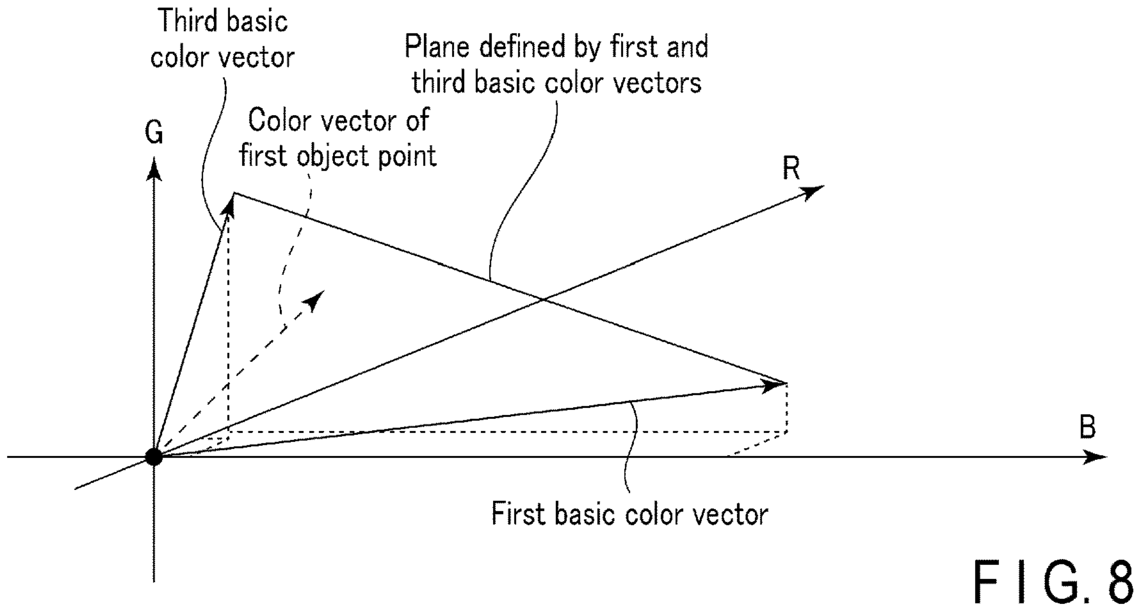
FIG. 8 shows an example of color vectors on a BRG color coordinate space by the optical inspection apparatus according to the third modification of the first embodiment.

As shown in FIG. 7, the wavelength selection portion 14 may include a third wavelength selection region 33. The third wavelength selection region 33 is provided between (or at the boundary of) the first wavelength selection region 31 and the second wavelength selection region 32. The third wavelength selection region 33 shown in FIG. 7 is arranged in place of the wavelength shielding region **16*a* shown in FIG. 6** of the second modification.

Light components that have passed through the first wavelength selection region 31, the second wavelength selection region 32, and the third wavelength selection region 33 are light components of wavelength spectra different from each other. Also, if the light component of each wavelength spectrum is captured by the image sensor 22 of the imaging portion 12, color vectors having directions different from each other are obtained. Here, if the number of wavelength selection regions is N, the number of dimensions of a color vector is N. In the third modification, since N is 3, the color vector is a three-dimensional color vector. That is, in the third modification, the image sensor 22 has, in each pixel, a first color channel that receives the light component of the first wavelength spectrum, a second color channel that receives the light component of the second wavelength spectrum, and a third color channel that receives the light component of the third wavelength spectrum from the object points O1 and O2, and receives the light component of the first wavelength spectrum, the light component of the second wavelength spectrum, and the light component of the third wavelength spectrum as different signal vectors. The wavelength selection portion 14 and the image sensor 22 are arranged such that, in each of pixels of the image sensor 22 corresponding to the object points O1 and O2 on the object surface O, the magnitude relationship of the pixel value between the first color channel, the second color channel, and the third color channel changes in accordance with the spread of the direction distribution of light at each of the object points O1 and O2.

The light component of first BRDF at the first object point O1 passes through the boundary between the first wavelength selection region 31 and the third wavelength selection region 33. Also, the light component of the second BRDF at the second object point O2 passes through the first wavelength selection region 31, the second wavelength selection region 32, and the third wavelength selection region 33. At this time, the direction of the first color vector at the first object point O1 is different from that of the second color vector at the second object point O2. Hence, the processing unit 18 correctly estimates that the spread of the distribution of the BRDF at the first object point O1 is different from the spread of the distribution of the BRDF at the second object point O2. On the other hand, if the third wavelength selection region 33 is absent, there is a possibility that the processing unit 18 estimates that the spread of the distribution of the BRDF at the first object point O1 is the same as that at the second object point O2 due to the light component passing through the boundary (see FIG. 1) between the first wavelength selection region 31 and the second wavelength selection region 32. That is, according to the third modification, the wavelength selection portion 14 includes the third wavelength selection region 33 in addition to the first wavelength selection region 31 and the second wavelength selection region 32, and the processing unit 18 can thus reliably estimate the difference of the distribution of the BRDF between the first object point O1 and the second object point O2.

A color vector corresponding to the first wavelength spectrum is defined as a first basic color vector, a color vector corresponding to the second wavelength spectrum is defined as a second basic color vector, and a color vector corresponding to the third wavelength spectrum is defined as a third basic color vector. For example, if the light from the first object point O1 passes through the first wavelength selection region 31, or the third wavelength selection region 33, or the boundary between the first wavelength selection region 31 and the third wavelength selection region 33, color vectors on a BRG color coordinate space are as shown in FIG. 8. That is, the end point of the color vector is located on a plane defined by the first basic color vector and the third basic color vector. Similarly, if the light from the first object point O1 passes through the third wavelength selection region 33, or the second wavelength selection region 32, or the boundary between the third wavelength selection region 33 and the second wavelength selection region 32, the end point of the vector is located on a plane defined by the third basic color vector and the second basic color vector. On the other hand, the color vector at the second object point O2 is a linear combination of the first basic color vector, the second basic color vector, and the third basic color vector each of which is multiplied by a coefficient that is not 0. At this time, it is indicated that, based on the linear independence of vectors, the direction of the color vector at the second object point O2 is different from the direction of the color vector at the first object point O1. That is, according to the third modification, the processing unit 18 can identify the spread of the direction distribution of light at each of the first object point O1 and the second object point O2.

On the other hand, consider a case where if the light components that have passed through the first wavelength selection region 31, the second wavelength selection region 32, and the third wavelength selection region 33 are captured by the image sensor 22 of the imaging portion 12, the signal vectors are signal vectors (color vectors) that are "not linearly independent" of each other. For example, assume that the light that has passed through the first wavelength selection region 31 is blue light, the light that has passed through the second wavelength selection region 32 is red light, and the light that has passed through the third wavelength selection region 33 is blue-red light obtained by adding blue light and red light. At this time, three signal vectors corresponding to the blue light, the red light, and the blue-red light are not linearly independent of each other.

That is, the signal vector of the blue-red light can be expressed by the linear combination of the signal vectors of the blue light and the red light. Hence, it is impossible to discriminate whether the light from an object point includes two light components of blue light and red light, or includes one light component of blue-red light. For this reason, if the imaging portion 12 receives blue-red light, it can only be considered that the light has passed through the third wavelength selection region 33 unless scattering and branching of light are assumed (taken into consideration). On the other hand, if scattering and branching of light are assumed, it is possible to estimate whether the light has passed through the third wavelength selection region 33, or passed through the first wavelength selection region 31 and the second wavelength selection region 32. This prevents the spread of the direction distribution of light caused by a minute defect from being missed. That is, it is possible to prevent a minute defect from being missed.

Thus, the optical system is configured such that the plurality of signal vectors for the light components of at least two different wavelength spectra passing through the wavelength selection regions are linearly independent of each other. Here, "the optical system is configured such that the light components are linearly independent" means appropriately setting the positional relationship between the wavelength selection regions, the imaging portion, and the illumination and the shapes and characteristics thereof to make the signal vectors linearly independent.

Second Embodiment

An optical inspection apparatus 10 according to this embodiment will be described below with reference to FIGS. 9 and 10. The basic configuration of the optical inspection apparatus 10 according to this embodiment is the same as the optical inspection apparatus 10 according to the first embodiment, and partially different parts and differences will be described below. Hence, the same reference numerals as in the first embodiment denote the same members as those described in the first embodiment or members having the same functions, and a detailed description thereof will be omitted.

Figure 9:
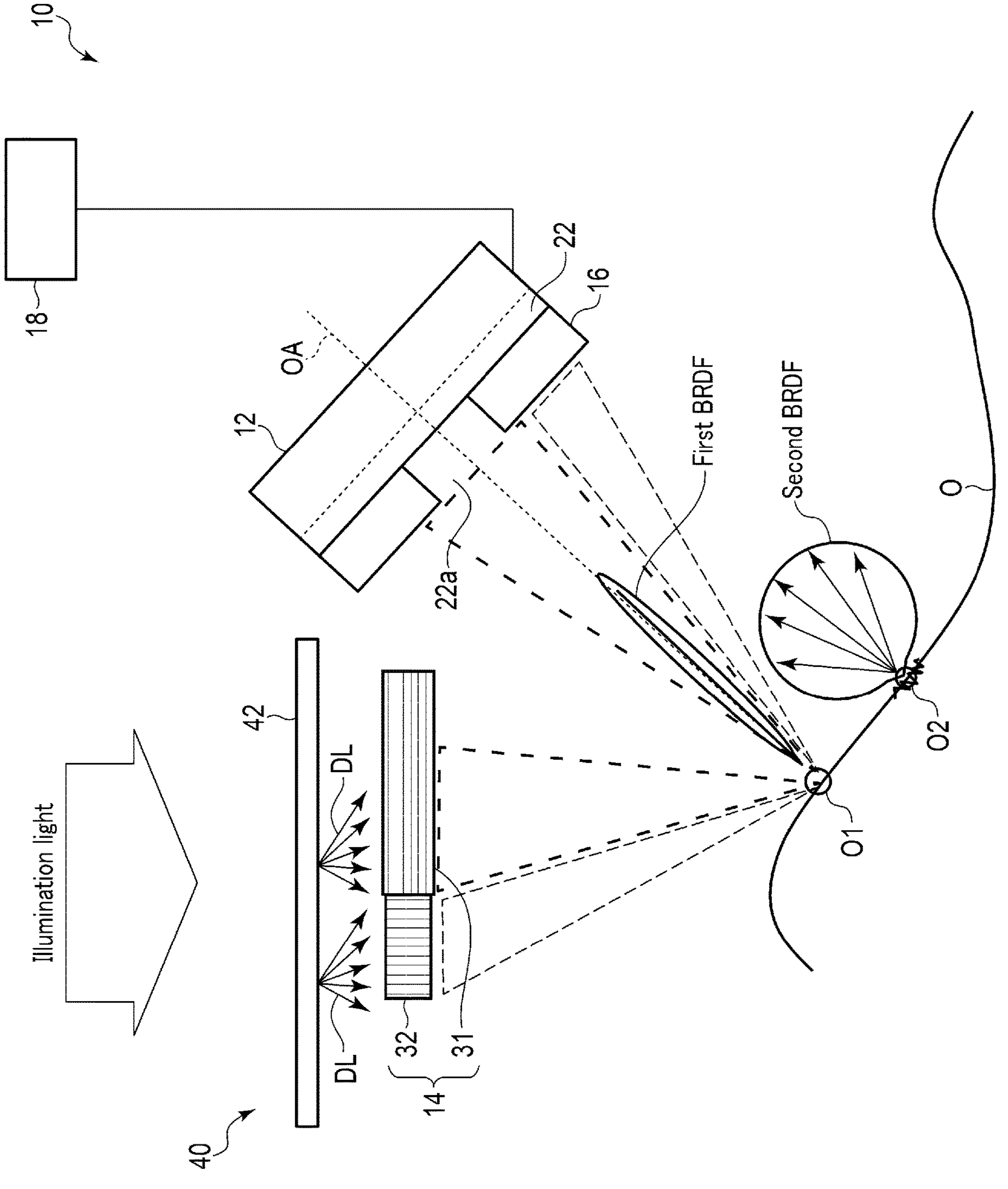
FIG. 9 is a schematic view showing an optical inspection apparatus according to the second embodiment.

FIG. 9 is a schematic sectional view of the optical inspection apparatus 10 according to this embodiment. The optical inspection apparatus 10 according to this embodiment includes an imaging portion 12, a wavelength selection portion 14, and an illumination unit 40 that illuminates an object surface O.

The imaging portion 12 includes an image sensor 22 controlled by a processing unit 18, and an imaging side shielding portion 16 that adjusts an opening 22*a* of the image sensor 22. The imaging portion 12 can include an imaging optical element (not shown). The opening 22*a* of the image sensor 22 of the imaging portion 12 is provided with the imaging side shielding portion 16. The imaging side shielding portion 16 sets the imaging opening 22*a* of light to be received by the image sensor 22 such that in pixels of the image sensor 22 corresponding to object points O1 and O2, the magnitude relationship of the pixel value between a first color channel and a second color channel changes in accordance with the spread of the direction distribution of light at each of the object points O1 and O2.

Also, the wavelength selection portion 14 is arranged at a position farther apart from the image sensor 22 of the imaging portion 12 along an optical axis OA than the object points O1 and O2. That is, in this embodiment, the wavelength selection portion 14 does not exist between the object points O1 and O2 and the imaging portion 12. The wavelength selection portion 14 may be included in the illumination unit 40.

The illumination unit 40 further includes a light diffusion portion 42 that diffuses illumination light.

For the illumination light, a special light source may be prepared, but this is not always necessary. For example, ambient light in an office or natural light such as sunlight can be used. That is, the light source of illumination light is not always necessary.

In this embodiment, the illumination light is ambient light from a ceiling light installed above the light diffusion portion 42. The distance between the light diffusion portion 42 and the ceiling light is sufficiently large. If these are apart by several meters, a beam of white light with high parallelism reaches the light diffusion portion 42.

The light diffusion portion 42 branches one light beam that enters the light diffusion portion 42 into light beams in at least two different directions. That is, the light diffusion portion 42 diffuses light that enters the light diffusion portion 42 as diffused light DL. The diffusion may be caused by, for example, a diffraction phenomenon due to minute unevenness. Alternatively, the diffusion may be caused by any phenomenon such as a light absorption/emission phenomenon, a light absorption/fluorescent phenomenon, a geometric refraction phenomenon caused by a refractive index medium, a light scattering phenomenon caused by a reflective scattering body, or a light scattering phenomenon caused by a transparent scattering body or a white scattering body. In this embodiment, the light diffusion portion 42 uses frosted glass. That is, the frosted glass serving as the light diffusion portion 42 diffuses incident light to increase the angle of divergence, and passes the light as the diffused light DL.

The operation of the optical inspection apparatus 10 according to this embodiment will be described.

For example, illumination light from ambient light reaches the light diffusion portion 42 and is diffused and passed as the diffused light DL. The passed diffused light DL reaches both a first wavelength selection region 31 and a second wavelength selection region 32 of the wavelength selection portion 14. Light that has passed through the first wavelength selection region 31 changes to light of a first wavelength spectrum, and light that has passed through the second wavelength selection region 32 changes to light of a second wavelength spectrum. The light of the first wavelength spectrum has a significant light intensity within the wavelength range of 400 nm to 550 nm, and this is, for example, blue light. Also, for example, the second wavelength spectrum has a significant light intensity within the wavelength range of 500 nm to 700 nm, and this is, for example, red light. However, the wavelength spectra are not limited to these, and arbitrary wavelength spectra are usable. The light components of the wavelength spectra that have passed through the first wavelength selection region 31 and the second wavelength selection region 32 may have a single wavelength.

The image sensor of the imaging portion 12 receives the light of the first wavelength spectrum and the light of the second wavelength spectrum as color vectors (signal vectors) in different directions. The signal vector of the light of the first wavelength spectrum is defined as a first basic color vector. The signal vector of the light of the second wavelength spectrum is defined as a second basic color vector. The processing unit 18 can identify the first wavelength spectrum and the second wavelength spectrum by the difference of the direction of the color vector.

In FIG. 10, the imaging side and the illumination side are schematically simultaneously illustrated on the upper and lower side, setting the object surface O of the imaging portion 12 (including the surface captured into an image by the imaging portion 12 (including the object points O1 and O2)) as the boundary in the sectional view of FIG. 9. Here, of the normal directions on the object surface O, a normal direction facing the imaging side (the side of the image sensor 22) is defined as an imaging side normal direction. On the other hand, of the normal directions on the object surface O, a normal direction facing the illumination side is defined as an illumination side normal direction. A solid angle based on the imaging side normal direction is defined as an imaging side solid angle, and a solid angle based on the illumination side normal direction is defined as an illumination side solid angle. FIG. 10 virtually draws the actual illumination side as mirror symmetric to the object surface O if the object O (see FIG. 9) surface-reflects light. On the other hand, if the object O is transparent and passes light, FIG. 10 can be considered as an actual sectional view.

In this specification, when comparing the imaging side solid angle and the illumination side solid angle, one of the solid angles point-symmetric with respect to the object point O1 or O2 is considered and compared with the other. For example, "the imaging side solid angle and the illumination side solid angle at the object point O1 or O2 equal" means that these are point-symmetric with respect to the object point O1 or O2.

An illumination side solid angle at which the light of the first wavelength spectrum passing through the first wavelength selection region 31 reaches the first object point O1 is defined as a (1-1)th illumination side solid angle α11. An illumination side solid angle at which the light of the second wavelength selection region passing through the second wavelength selection region 32 reaches the first object point O1 is defined as a (1-2)th illumination side solid angle α12. An imaging side solid angle of light that reaches from the first object point O1 to the opening 22*a* of the image sensor 22 of the imaging portion 12 is defined as a (1-1)th imaging side solid angle β11. An imaging side solid angle of light that reaches from the first object point O1 to the imaging side shielding portion 16 is defined as a (1-2)th imaging side solid angle β12. If a horizontal object surface is defined as shown in FIG. 10, the illumination side solid angle is reflected to the object surface, and the illumination side solid angle and the imaging side solid angle are compared on the imaging side, the (1-1)th imaging side solid angle β11 is included in the (1-1)th illumination side solid angle α11 ((1-1)th illumination side solid angle α11≥(1-1)th imaging side solid angle β11). Similarly, if a horizontal object surface is defined as shown in FIG. 10, the illumination side solid angle is reflected to the object surface, and the illumination side solid angle and the imaging side solid angle are compared on the imaging side, the (1-2)th imaging side solid angle β12 includes the (1-2)th illumination side solid angle α12 ((1-2)th illumination side solid angle α12≤(1-2)th imaging side solid angle β12). That is if the (1-2)th illumination side solid angle α12 in FIG. 10 is reflected by the object surface O, and the (1-2)th illumination side solid angle α12 and the (1-1)th imaging side solid angle β11 are compared on the imaging side, these do not have a common region.

A solid angle occupied by a light beam that reaches from the object point O1 or O2 to the opening (imaging opening) 22*a* of the image sensor 22 of the imaging portion 12 is called an imaging opening solid angle β. For example, the (1-1)th imaging side solid angle β11 is the imaging opening solid angle β at the first object point O1.

An illumination side solid angle at which the light of the first wavelength spectrum passing through the first wavelength selection region 31 reaches the second object point O2 is defined as a (2-1)th illumination side solid angle α21. An illumination side solid angle at which the light of the second wavelength selection region passing through the second wavelength selection region 32 reaches the second object point O2 is defined as a (2-2)th illumination side solid angle α22.

The first object point O1 is on the standard surface of the object O (see FIG. 9). The second object point O2 is on a minute defect on the object O (see FIG. 9).

If a light beam of the first wavelength spectrum in the (1-1)th illumination side solid angle α11 enters the first object point O1, reflected light has a (1-1)th light beam direction distribution (BRDF) substantially close to specular reflection. If a light beam of the second wavelength spectrum in the (1-2)th illumination side solid angle α12 enters the first object point O1, reflected light has a (1-2)th light beam direction distribution (BRDF) substantially close to specular reflection. If a light beam in the (2-1)th illumination side solid angle α21 or the (2-2)th illumination side solid angle α22 enters the second object point O2, in both cases, reflected light has a second light beam direction distribution (BRDF) close to Lambertian reflection. Here, the (1-1)th light beam direction distribution and the (1-2)th light beam direction distribution are narrower than the second light beam direction distribution.

The solid angle occupied by the (1-1)th light beam direction distribution has a common region to, for example, the (1-1)th imaging side solid angle β11 and the (1-2)th imaging side solid angle β12. The solid angle occupied by the (1-2)th light beam direction distribution is included in, for example, the (1-2)th imaging side solid angle β12. That is, the solid angle occupied by the (1-2)th light beam direction distribution does not have a common region to the (1-1)th imaging side solid angle β11. For this reason, the first object point O1 is captured by the image sensor 22 only by the light of the first wavelength spectrum. That is, the first object point O1 is not captured by the image sensor 22 by the light of the second wavelength spectrum. This is because the light of the second wavelength spectrum passing through the (1-2)th imaging side solid angle β12 is shielded by the shielding portion 16.

The second light beam direction distribution is wider than the (1-1)th light beam direction distribution and the (1-2)th light beam direction distribution. Both the first wavelength spectrum of the (2-1)th illumination side solid angle α21 and the second wavelength spectrum of the (2-2)th illumination side solid angle α22 are reflected by the second object point O2 and change to the second light beam direction distribution. The solid angle occupied by the second light beam direction distribution has a common region to the solid angle occupied by the light beam that reaches from the second object point O2 to the imaging opening 22*a*. Thus, the second object point O2 is captured by both the first wavelength spectrum and the second wavelength spectrum.

Hence, in a pixel of the captured image corresponding to the first object point O1, the pixel value of the first color channel that receives the light of the first wavelength spectrum has a value larger than the pixel value of the second color channel that receives the light of the second wavelength spectrum. On the other hand, in a pixel corresponding to the second object point O2, the pixel values of both the first color channel that receives the light of the first wavelength spectrum and the second color channel that receives the light of the second wavelength spectrum have significant values. That is, the processing unit 18 can obtain information about the spread of the distribution of the BRDF based on the ratio of the pixel values of the color channels in each pixel. Hence, as described with reference to FIGS. 2 and 3 of the first embodiment, the processing unit 18 can determine the surface property at the first object point O1 and the surface property at the second object point O2.

Thus, the processing unit 18 can identify the difference of the BRDF between the first object point O1 and the second object point O2 as the difference of the direction between the first color vector and the second color vector. Hence, the processing unit 18 can identify the presence/absence of a minute defect on the object O. If the processing unit 18 acquires a standard surface and the reference (reference direction) of a color vector to a minute defect in advance, the processing unit 18 can identify whether the object point O1 or O2 as the target is on the standard surface or a minute defect by collating the direction of the captured color vector with the reference. Hence, as described with reference to FIGS. 4 and 5 of the first embodiment, the processing unit 18 can determine the surface property at the first object point O1 and the surface property at the second object point O2.

In this embodiment, if the imaging side shielding portion 16 does not exist, that is, if the light of the second wavelength spectrum having the (1-2)th light beam direction distribution (BRDF) can reach the opening 22*a* of the image sensor 22 of the imaging portion 12, the first object point O1 is captured by the light of the second wavelength spectrum. In other words, if the imaging side shielding portion 16 does not exist, and the size of the opening 22*a* is not adjusted by the imaging side shielding portion 16, that is, if the solid angle occupied by the (1-2)th light beam direction distribution (BRDF) is larger than the (1-2)th imaging side solid angle β12 (in this case, 0), the first object point O1 is captured by both the light of the first wavelength spectrum and the light of the second wavelength spectrum. At this time, it is difficult for the processing unit 18 to identify the first color vector at the first object point O1 and the second color vector at the second object point O2. This is because at this time, each of the first color vector and the second color vector is a vector obtained by superimposing both the light of the first wavelength spectrum and the light of the second wavelength spectrum. For this reason, the direction of the first color vector and the direction of the second color vector may be close or match. On the other hand, if the imaging side shielding portion 16 exists, and the opening 22*a* is adjusted, that is, if the light of the second wavelength spectrum having the (1-2)th light beam direction distribution (BRDF) is shielded by the imaging side shielding portion 16, the first object point O1 is not captured by the image sensor 22 by the second wavelength spectrum. Hence, the first color vector and the second color vector never match based on the linear independence of vectors. That is, the direction of the first color vector and the direction of the second color vector are always different, and these do not match any longer. For this reason, the processing unit 18 can identify the difference of the direction between the first color vector and the second color vector and can identify the difference of the direction distribution of light. Based on this, the processing unit 18 can identify the presence/absence of a minute defect on the object surface O.

What described above can be rephrased as follows. That is, illumination light has at least two different first and second wavelength spectra, and the illumination light is passed through the wavelength selection portion 14 including the first wavelength selection region 31 that shields a light component of at least one wavelength not included in the light of the first wavelength spectrum and the second wavelength selection region 32 that shields a light component of at least one wavelength not included in the light of the second wavelength spectrum. Each of the object points O1 and O2 is irradiated with the light of the first wavelength spectrum and the light of the second wavelength spectrum. With the object surface as a boundary including the object points O1 and O2 captured as an image by the light that has passed through the opening 22*a* of the imaging portion 12, a side closer to the imaging portion 12 is defined as an imaging side, and a side far from the imaging portion is defined as an illumination side. Then, the imaging portion 12 including at least two color channels capable of receiving the light of the first wavelength spectrum and the light of the second wavelength spectrum is caused to capture the object points O1 and O2, such that: with respect to the object points O1 and O2, the (1-1)th illumination side solid angle α11 corresponding to the first wavelength selection region 31 and the (1-2)th illumination side solid angle α12 corresponding to the second wavelength selection region 32 are defined. With respect to the object points O1 and O2, the imaging opening solid angle β corresponding to the imaging opening 22*a* is defined, one of the (1-1)th illumination side solid angle α11 and the (1-2)th illumination side solid angle α12 does not have a common region to the imaging opening solid angle β. This makes it possible to identify the presence/absence of a minute defect on the object surface O.

In this embodiment, both the first object point O1 and the second object point O2 are captured by the light of the first wavelength spectrum. Hence, the processing unit 18 can acquire, by blue light, information about the presence/absence of an object at each of the object points O1 and O2. That is, if the object O exists at each object point O1 or O2, the processing unit 18 can recognize this. Also, if the first object point O1 and the second object point O2 are captured by the light of the first wavelength spectrum, the processing unit 18 can identify the difference of the reflectance between the object points O1 and O2 based on the signal strengths of the color vectors (the first color vector and the second color vector).

Thus, the optical inspection apparatus 10 "can capture the object O by the imaging portion 12 configured to, using at least two illumination light beams having illumination side solid angles α1 (α11, α12) and α2 (α21, α22) different from each other and wavelength spectrums (blue light and red light) different from each other, shield light from an imaging side solid angle (β11, β12) equal to the illumination side solid angles α1 (α11, α12) and α2 (α21, α22) of one illumination light beam, and identify the difference of the direction distribution of the light from the object point based on an image captured by color channels that receive the light components of the two different wavelength spectra as signal vectors having different directions".

Alternatively, an optical inspection method according to this embodiment includes "for an image captured by color channels that receive the light components of the two different wavelength spectra as signal vectors having different directions by the imaging portion 12 configured such that, of two wavelength spectra that pass through the at least two different wavelength selection regions 31 and 32 of the wavelength selection portion 14, the illumination side solid angle α11 of the light component of at least one of the wavelength spectra has a common region to the imaging opening solid angle β, and the illumination side solid angle β12 of the light component of the other wavelength spectrum does not have a common region to the imaging opening solid angle β, estimating the spread of the direction distribution of light at each of the object points O1 and O2 based the image".

The optical inspection method according to this embodiment includes passing illumination light through a wavelength selection portion 14 and irradiating object points O1 and O2 with the illumination light. The illumination light has at least two different first and second wavelength spectra. The wavelength selection portion 14 includes the first wavelength selection region 31 that is configured to shield a light component of at least one wavelength not included in a light component of the first wavelength spectrum, and the second wavelength selection region 32 that is configured to shield a light component of at least one wavelength not included in a light component of the second wavelength spectrum. The optical inspection method includes causing the imaging portion 12 including at least two color channels configured to receive the light component of the first wavelength spectrum and the light component of the second wavelength spectrum to capture the object points O1 and O2, such that: with the object surface O as a boundary including the object points O1 and O2 captured as an image by the light that has passed through the imaging opening 22*a* of the imaging portion 12, a side closer to the imaging portion 12 is defined as an imaging side, and a side far from the imaging portion 12 is defined as an illumination side, with respect to the object points O1 and O2, the first illumination side solid angles α11 and α21 corresponding to the first wavelength selection region 31 and the second illumination side solid angles α12 and α22 corresponding to the second wavelength selection region 32 are defined, with respect to the object points O1 and O2, the imaging opening solid angle β corresponding to the imaging opening 22*a* are defined, and one of the first illumination side solid angle α11 or α21 and the second illumination side solid angle α12 or α22 does not have a common region to the imaging opening solid angle β. The optical inspection method includes defining the light component of the first wavelength spectrum and the light component of the second wavelength spectrum as signal vectors having different directions based on light reception data by the at least two color channels for the object points O1 and O2. And then, the optical inspection method includes estimating spread of a direction distribution of light at each of the object points O1 and O2 based on the directions of the signal vectors. An optical inspection program according to this embodiment causes a computer to execute processing of the above-described optical inspection method. The optical inspection apparatus 10 according to this embodiment causes the processing unit 18 to execute processing of the above-described optical inspection method.

Hence, by using the optical inspection method, the optical inspection program, or the optical inspection apparatus 10, the spread of the distribution of the BRDF at each of the object points O1 and O2 can be identified, and the surface property at each of the object points O1 and O2 can be determined.

The optical inspection method includes after passing the light components of the at least two different wavelength spectra through the light diffusion portion 42, further passing the light components through the wavelength selection portion 14.

By the light diffusion portion 42, the angle of divergence can be increased, and illumination light can be made to enter the wavelength selection portion 14.

The optical inspection apparatus 10 according to this embodiment includes the wavelength selection portion 14, the image sensor 22, and the shielding portion 16. Illumination light including light components of at least two different wavelength spectra enters the wavelength selection portion 14. The wavelength selection portion 14 irradiates the object surface O including the object points O1 and O2 with the light of the first wavelength spectrum and the light of the second wavelength spectrum. The image sensor 22 has, in each pixel, the first color channel that receives the light of the first wavelength spectrum from the object point, and the second color channel that receives the light of the second wavelength spectrum, and receives the light of the first wavelength spectrum and the light of the second wavelength spectrum as different signals. The imaging side shielding portion 16 adjusts a region where light enters the image sensor 22, thereby receiving, in pixels corresponding to the object points O1 and O2 on the object surface O, different signal vectors in accordance with the spread of the distribution of the BRDF at each of the object points O1 and O2. For example, signal vectors in two modes, like a first mode in which one of the pixel value of the first color channel and the pixel value of the second color channel has a larger value as compared to the other, and a second mode in which both the pixel value of the first color channel and the pixel value of the second color channel have significant values, are received in accordance with the spread of the distribution of the BRDF. For this reason, the spread of the distribution of the BRDF at each of the object points O1 and O2 can be identified depending on whether the image sensor 22 receives the signals in the first mode or receives the signals in the second mode, and the surface property at each of the object points O1 and O2 can be determined.

As described above, according to this embodiment, it is possible to provide an optical inspection method, a non-transitory storage medium storing an optical inspection program, and the optical inspection apparatus 10 capable of acquiring information of the object O even in a case where light is scattered, diffused, or diffracted in various directions in the object O.

First Modification

The first modification of the second embodiment of the optical inspection apparatus 10 will be described with reference to FIG. 11.

In the optical inspection apparatus 10 according to the first modification of the second embodiment, the illumination unit 40 may use a light source 44, as shown in FIG. 11, together with the ambient light or in place of the ambient light.

The light source 44 may be, for example, a laser light source. In this case, the image sensor 22 of the imaging portion 12 can capture the image of the object O brighter than the ambient light. Then, since the pixel values of the captured image are large, and the resistance to noise of the pixel values such as a dark current noise increases, the S/N improves.

Since the laser light source 44 generally has a single color, it is preferable that phosphor is used as the light diffusion portion 42. For example, the laser light source emits blue light, and the phosphor absorbs blue light and emits green light. The phosphor can emit light in various directions at the time of light emission.

The light source 44 may be, for example, a white LED. In many cases, the white LED is formed by a plurality of blue point light sources, and a green or red phosphor. Here, the phosphor can function as the light diffusion portion 42. Hence, it can be considered that the white LED integrates the light source 44 and the light diffusion portion 42. However, if the light diffusion portion 42 is arranged apart from the light source 44, light can be diffused at a point closer to the object point. For this reason, the white LED serving as the light source 44 can generate illumination light of various solid angles.

Alternatively, the illumination light source 44 can be any light source that emits light, for example, an LD light source, a halogen lamp, or a xenon lamp.

Furthermore, the illumination light source 44 can generate illumination light of higher uniformity by the light diffusion portion 42. In addition, if the light diffusion portion 42 diffuses the illumination light to generate the diffused light DL, the brightness of the light from the ambient light can be reduced. Thus, the optical inspection apparatus 10 can prevent the ambient light from entering the image sensor 22 at a specific illumination side solid angle and becoming noise light that extremely changes the color vector to be processed by the processing unit 18.

Also, since the light diffusion portion 42 exists, it is possible to make the light of the ambient light reach the entire wavelength selection portion 14 without any special light source and generate illumination light components of various solid angles.

Second Modification

The second modification of the second embodiment of the optical inspection apparatus 10 will be described with reference to FIG. 12.

FIG. 12 shows an example in which a first light source 44*a* and a second light source 44*b*, which have different wavelength spectra, and a beam splitter 44*c* are provided as the light source 44. Light components from the first light source 44*a* and the second light source 44*b* are multiplexed (light beams on two different light beam paths are multiplexed into light on the same path) by the beam splitter 44*c*. The beam splitter 44*c* may be a non-polarization beam splitter (half mirror), a polarization beam splitter, or a dichroic mirror. The beam splitter 44*c* is not limited to these, and any element capable of multiplexing two light beams can be used. In a case where a polarization beam splitter is used, if a polarization camera capable of sensing the polarization direction is used for the image sensor 22 of the imaging portion 12, information about the direction distribution of light at the object point can be obtained more robustly by using the polarization information like the color information. In addition, using the two light sources 44*a* and 44*b*, for example, a wavelength spectrum having two apart peaks can newly be generated in the wavelength spectrum. Alternatively, the light intensities of the two light sources 44*a* and 44*b* can appropriately be adjusted. Thus, for example, the direction of the color vector of the first wavelength spectrum and the direction of the color vector of the second wavelength spectrum can be made largely different, and the processing unit 18 can more correctly acquire the information about the direction distribution of light.

Also, for example, the processing unit 18 may electrically turn on or off the two light sources 44*a* and 44*b*. The processing unit 18 can, for example, independently on/off-control the two light sources 44*a* and 44*b*. In this embodiment, the direction of light and the wavelength spectrum are associated by the wavelength selection portion 14. For this reason, if the processing unit 18 independently on/off-controls the two light sources 44*a* and 44*b*, the processing unit 18 can time-serially change the direction distribution of light. Thus allows the processing unit 18 to make the correspondence relationship between the direction distribution of light and the wavelength spectrum more clear. Also, the processing unit 18 that on/off-controls the light sources 44*a* and 44*b* can reduce crosstalk between two light components of similar wavelength spectra.

Third Embodiment

An optical inspection apparatus 10 according to the third embodiment will be described with reference to FIG. 13. The optical inspection apparatus 10 according to this embodiment is basically the same as the optical inspection apparatus 10 according to the first embodiment. The differences from the optical inspection apparatus 10 according to the first embodiment will be described.

FIG. 13 is a schematic sectional view of the optical inspection apparatus 10 according to this embodiment. In FIG. 13, an object surface O of an imaging portion 12 is set to a reference, as in FIG. 10 of the second embodiment, and the imaging side and the illumination side are simultaneously illustrated on the upper and lower sides of the object surface O. The imaging portion 12 forms an image of a first object point O1 at a first image point I1, and an image of a second object point O2 at a second image point I2. In this embodiment, the imaging portion 12 includes an image sensor 22 and an imaging optical element 24. Also, the optical inspection apparatus 10 includes an illumination unit 40 including a white LED light source 44 and an illumination lens 46 on the illumination side.

A wavelength selection portion 14 includes a first wavelength selection region 31, a second wavelength selection region 32, and a third wavelength selection region 33. The first wavelength selection region 31 is provided between the second wavelength selection region 32 and the third wavelength selection region 33. The first wavelength selection region 31 crosses an optical axis OA. A first wavelength spectrum passes through the first wavelength selection region 31, a second wavelength spectrum passes through the second wavelength selection region 32, and a third wavelength spectrum passes through the third wavelength selection region 33. The first wavelength spectrum s blue light (B), the second wavelength spectrum is red light (R), and the third wavelength spectrum is green light (G). The first wavelength spectrum, the second wavelength spectrum, and the third wavelength spectrum have peaks at wavelengths of 450 nm, 650 nm, and 550 nm, respectively.

The image sensor 22 of the imaging portion 12 is an area sensor. However, the image sensor 22 is not limited to this, and any element capable of acquiring an image, such as a line sensor, is usable. The image sensor 22 has three different color channels (B, R, G).

In an image captured by the image sensor 22 of the imaging portion 12, light components of the first wavelength spectrum, the second wavelength spectrum, and the third wavelength spectrum define to color vectors (signal vectors) in different directions. These are defined as a first basic color vector, a second basic color vector, and a third basic color vector, respectively. Here, the direction of linear combination of the first basic color vector and the second basic color vector (a vector obtained by multiplying these vectors by a coefficient that is not 0 and adding them) is always different from the direction of linear combination of the first basic color vector, the second basic color vector, and the third basic color vector. That is, the directions of these vectors are always different due to mathematical linear independence, and a processing unit 18 can identify these. That is, the three basic color vectors are linearly independent of each other and can therefore be identified by the processing unit 18.

The imaging optical element 24 is, for example, an imaging lens. In FIG. 13, the imaging lens serving as the imaging optical element 24 is schematically illustrated as one representative lens. However, this may be a group lens formed by a plurality of lenses. Alternatively, the imaging optical element 24 may be a concave mirror, a convex mirror, or a combination thereof. That is, the imaging optical element 24 can be any optical element having a function of focusing light beam groups that have exited from one point of the object O, that is, object points O1 and O2 to the conjugate image points I1 and I2. Focusing (condensing) the light beam groups that have exited from the object points O1 and O2 on the surface of the object O to the image points I1 and I2 by the imaging optical element 24 is called imaging. Alternatively, imaging may be expressed as transferring the object points O1 and O2 to the image points (the conjugate points of the object points) I1 and I2. Also, an aggregate surface of conjugate points to which the light beam groups that have exited from the sufficiently far object points are transferred by the imaging optical element 24 is called the focal plane of the imaging optical element 24. Also, a line that is vertical to the focal plane and passes through the center of the imaging optical element 24 is defined as the optical axis OA. At this time, the conjugate image points I1 and I2 of the object points O1 and O2 transferred by the light beams are called focal points.

In this embodiment, the wavelength selection portion 14 is arranged along the optical axis OA between the imaging optical element (imaging lens) 24 and the object points O1 and O2.

On the illumination side, for example, a Fresnel lens is used as the illumination lens 46. Light from the white LED light source 44 placed at the focal point of the illumination lens 46 is emitted as illumination light that is parallel light by the Fresnel lens 46 to the object O. Hence, white light having a (1-1)th illumination side solid angle α11 enters the first object point O1. White light having a (2-1)th illumination side solid angle α21 enters the second object point O2. The (1-1)th illumination side solid angle α11 and the (2-1)th illumination side solid angle α21 equal. Here, the white light includes all the first wavelength spectrum, the second wavelength spectrum, and the third wavelength spectrum.

On the imaging side, a solid angle occupied by a light beam that reaches from the first object point O1 to the first wavelength selection region 31 is defined as a (1-1)th imaging side solid angle β11, and a solid angle occupied by a light beam that reaches from the first object point O1 to the second wavelength selection region 32 is defined as a (1-2)th imaging side solid angle β12. In addition, a solid angle occupied by a light beam that reaches from the second object point O2 to the first wavelength selection region 31 is defined as a (2-1)th imaging side solid angle β21, and a solid angle occupied by a light beam that reaches the second wavelength selection region 32 is defined as a (2-2)th imaging side solid angle β22. A solid angle occupied by a light beam that reaches from the second object point O2 to the third wavelength selection region 33 is defined as a (2-3)th imaging side solid angle β23.

If a horizontal object surface is defined as shown in FIG. 13, the illumination side solid angle is reflected to the object surface, and the illumination side solid angle and the imaging side solid angle are compared on the imaging side, the (1-1)th illumination side solid angle α11 is included in the (1-1)th imaging side solid angle β11 ((1-1)th illumination side solid angle α11≤(1-1)th imaging side solid angle β11). Similarly, if a horizontal object surface is defined as shown in FIG. 13, the illumination side solid angle is reflected to the object surface, and the illumination side solid angle and the imaging side solid angle are compared on the imaging side, the (2-1)th illumination side solid angle α21 is included in the (2-2)th imaging side solid angle β22 ((2-1)th illumination side solid angle α21≤(2-1)th imaging side solid angle β21).

The operation of the optical inspection apparatus 10 according to this embodiment will be described next.

The first object point O1 is on the standard surface, and the second object point O2 is on a minute defect. For this reason, the light beam direction distribution at the first object point O1 is relatively narrow, and the light beam direction distribution at the second object point O2 is relatively wide. However, the light beam direction distributions at the first and second object points O1 and O2 are not limited to the above, and depending on the minute defect, the light beam direction distribution at the second object point O2 may be narrower than the light beam direction distribution at the first object point O1.

If a light beam having the (1-1)th illumination side solid angle α11 enters the first object point O1, a light beam having the (1-1)th light beam direction distribution (BRDF) passes through. That is, a light beam having the (1-1)th light beam direction distribution passes through the (1-1)th imaging side solid angle β11 and the (1-2)th imaging side solid angle 812. Of light beams having the (1-1)th light beam direction distribution, light of the first wavelength spectrum passes through the first wavelength selection region 31, and light of the second wavelength spectrum passes through the second wavelength selection region 32. The processing unit 18 captures the first object point O1 by the image sensor 22 of the imaging portion 12 using the light of the first wavelength spectrum and the light of the second wavelength spectrum. The color vector at the first image point I1 corresponding to the first object point O1 in the captured image is defined as a first color vector.

On the other hand, if a light beam having the (2-1)th illumination side solid angle α21 enters the second object point O2, a light beam having the (2-1)th light beam direction distribution (BRDF) passes through. That is, a light beam having the (2-1)th light beam direction distribution passes through the (2-1)th imaging side solid angle β21, the (2-2)th imaging side solid angle 22, and the (2-3)th imaging side solid angle β23. The light beam having the (2-1)th light beam direction distribution simultaneously passes through the first wavelength selection region 31, the second wavelength selection region 32, and the third wavelength selection region 33, and the second object point O2 is captured by the image sensor 22 of the imaging portion 12 using the light of the first wavelength spectrum, the light of the second wavelength spectrum, and the light of the third wavelength spectrum. The color vector at the second image point I2 corresponding to the second object point O2 in the captured image is defined as a second color vector.

Since the directions of the first basic color vector (the signal vector of the light of the wavelength spectrum passing through the first wavelength selection region 31), the second basic color vector (the signal vector of the light of the wavelength spectrum passing through the second wavelength selection region 32), and the third basic color vector (the signal vector of the light of the wavelength spectrum passing through the third wavelength selection region 33) are linearly independent of each other, the directions of the color vectors (the first color vector and the second color vector) at the first object point O1 and the second object point O2 are different from each other. Hence, the processing unit 18 can identify the difference of the light beam direction distribution between the first object point O1 and the second object point O2. If the processing unit 18 can identify the difference of the light beam direction distribution, the processing unit 18 can obtain information about the presence/absence of a minute defect. Also, if the processing unit 18 prepares a reference color vector for the light beam direction distribution on each of the standard surface and the minute defect and stores it in a storage medium or the like, the processing unit 18 can identify whether each of the object points O1 and O2 is on the standard surface or a minute defect by collating the reference color vector with each captured color vector (see FIGS. 4 and 5).

In this embodiment, the distance between the wavelength selection portion 14 and the object surface O is adjusted, thereby changing the imaging side solid angles to the wavelength selection regions 31, 32, and 33. Hence, the processing unit 18 can acquire information about the spread of the light beam direction distribution at each of the object points O1 and O2 in a desired range and sensitivity.

As described above, according to this embodiment, it is possible to provide an optical inspection method, a non-transitory storage medium storing an optical inspection program, and the optical inspection apparatus 10 capable of acquiring information of the object O even in a case where light is scattered, diffused, or diffracted in various directions in the object O.

First Modification

The first modification of the third embodiment of the optical inspection apparatus 10 will be described with reference to FIG. 14.

The first modification of the optical inspection apparatus 10 according to this embodiment will be described. In the first modification, as shown in FIG. 14, the same wavelength selection regions 31, 32, and 33 of the wavelength selection portion 14 are repetitively arranged. Hence, the wavelength selection portion 14 includes a first set 141 in which the plurality of wavelength selection regions 31, 32, and 33 different from each other are arranged, and a second set 142 in which the plurality of wavelength selection regions 31, 32, and 33 are arranged in the same array as the first set 141. The first set 141 and the second set 142 are arranged on the same surface. Although not illustrated, the wavelength selection portion 14 preferably further includes a third set in which the plurality of wavelength selection regions 31, 32, and 33 are arranged in the same array as the first set 141.

The first wavelength selection region 31, the second wavelength selection region 32, and the third wavelength selection region 33 pass light of the first wavelength spectrum, light of the second wavelength spectrum, and light of the third wavelength spectrum, respectively. The first wavelength spectrum, the second wavelength spectrum, and the third wavelength spectrum are blue light (B), green light (G), and red light (R) having peaks at wavelengths of 450 nm, 550 nm, and 650 nm, respectively. Thus, the wavelength selection portion 14 has an arrangement in which the first wavelength selection region 31, the second wavelength selection region 32, and the third wavelength selection region 33 are periodically repeated. Hence, the optical inspection apparatus 10 can widen the inspection range of the object surface O while suppressing the number of color channels necessary for the image sensor 22 of the imaging portion 12. In addition, if the wavelength selection portion 14 is included as background noise in a captured image, the background noise has periodicity. Hence, the processing unit 18 can identify the information of the object surface O by separating object surface information and the background noise using the periodicity.

In optical inspection using a captured image, if an image of only a minute defect can be extracted, inspection can easily be performed. Hence, the processing unit 18 prepares a background image including objects other than a minute defect in advance, and subtracts it from the original captured image. Here, the background image may be obtained by capturing the standard plane in advance, or may be created by a certain method in advance.

The captured image acquired by the image sensor 22 of the imaging portion 12 is a color image (RGB image) with three R, G, and B channels. Based on the color image with three channels, the processing unit 18 can generate various signal vectors. That is, the processing unit 18 can generate signal vectors based on light reception data in at least two color channels corresponding to an object point. An arbitrary method can be used to generate the signal vectors. For example, the processing unit 18 may generate signal vectors that directly have the pixel values of the three channels of a color image with the three R, G, and B channels. In this case, the processing unit 18 can convert the image into an RGB image of one channel using an RGB color scale. The RGB image is generally used to display the color image of three channels on various devices. Alternatively, the RGB image can be converted into an HSV color space formed by three components, that is, Hue, Saturation·Chroma, and Value·Brightness, and a signal vector having these components as the components of the vector can be generated. At this time, the processing unit 18 can obtain a hue image, a saturation·chroma image, and a value·brightness image each including one channel. In this embodiment, a hue has a strong correlation with the direction of a signal vector. Alternatively, the RGB image may be changed to a monochrome image of one channel using a grayscale from a signal vector that directly has the pixel values of the three channels as vector components. Alternatively, the processing unit 18 is not limited to the above in the present embodiment, and the image can be converted into various images of one channel. Here, the processing unit 18 converts the image into a hue image in the HSV color space. At this time, the pixel value of each pixel is I(m, n). Here, m and n are integers representing the position coordinates of a two-dimensional image.

At each position (m, n) of the hue image, the color vector is the linear combination of the first basic color vector, the second basic color vector, and the third basic color vector. At the object point O1 on the standard surface, a color vector corresponding to the direction distribution of light is a combination of two basic color vectors of the first basic color vector, the second basic color vector, and the third basic color vector. That is, a combination of two basic color vectors is selected from the three basic color vectors, and the two basic color vectors are multiplied by a coefficient that is not 0 and linearly combined. That is, linear combinations corresponding to three combinations of the first basic color vector and the second basic color vector, the second basic color vector and the third basic color vector, and the third basic color vector and the first basic color vector are obtained.

Also, at the object point O1 on the standard surface, the color vector corresponding to the direction distribution of light may be generated by one basic color vector of the first basic color vector, the second basic color vector, and the third basic color vector.

On the other hand, at the object point on a minute defect, a color vector corresponding to the direction distribution of light is a combination of all basic color vectors including the first basic color vector, the second basic color vector, and the third basic color vector. Here, since the first basic color vector, the second basic color vector, and the third basic color vector have different directions and are linearly independent, the directions of the color vectors at the first object point O1 and the second object point O2 are different based on the linear independence.

Thus, the processing unit 18 can identify, based on the direction of the color vector, whether each of the object points O1 and O2 is on the standard surface or a minute defect.

The processing unit 18 generates a background image based on the captured image acquired by the image sensor 22. As the background image, if the color vector in each pixel of the captured image is a combination of all basic color vectors including the first basic color vector, the second basic color vector, and the third basic color vector, the pixel value is 0. Otherwise, the color vector is I(m, n). Here, m and n are integers representing the position coordinates of a two-dimensional image.

Then, as shown by the processing procedure in FIG. 15, if the processing unit 18 subtracts the background image from the original captured image, only the image of a minute defect remains. That is, the processing unit 18 can remove an unnecessary background image.

Figure 16:
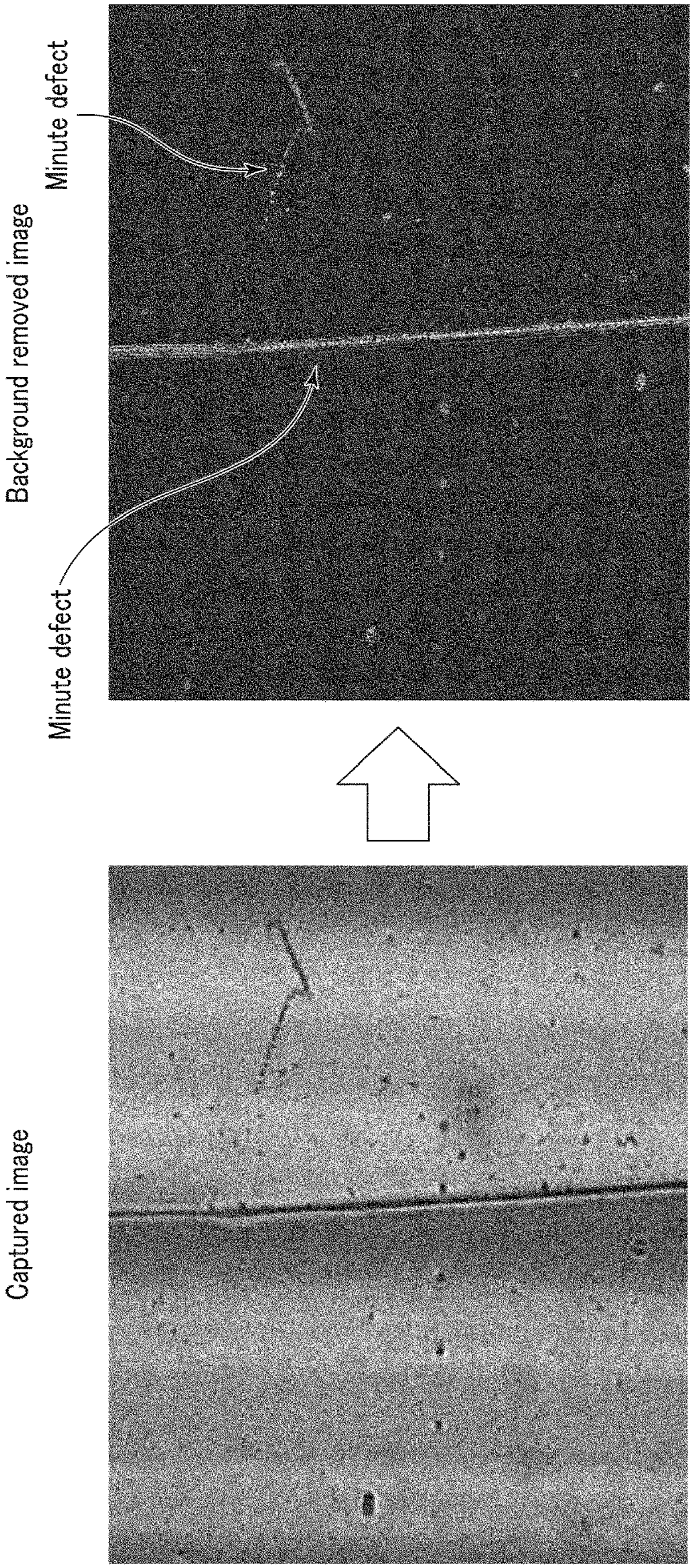
FIG. 16 is a view showing an image obtained by capturing minute defects on a white plastic plate and a background removed image thereof.

FIG. 16 shows an image obtained by actually capturing minute defects on a white plastic plate (left view) and a background removed image thereof (right view).

The above-described background image removal processing by the processing unit 18 can be performed on a pixel basis. For this reason, if the processing is performed by the processing unit 18 (computer) or the like, the processing speed can be increased by parallelization of the processing.

Also, the above-described background image matches an image obtained by capturing a standard object having a standard surface without a minute defect. Hence, an image obtained by capturing the standard object in advance may be used as the background image. In this case, since the processing of creating the background image is omitted, the processing unit 18 can further speed up the processing of creating the background removed image.

(Second Modification) (Multiwavelength Opening is Arranged on Focal Plane)

The second modification of the third embodiment of the optical inspection apparatus 10 according to this embodiment will be described.

FIG. 17 is a schematic sectional view of the optical inspection apparatus 10 according to the second modification. In the second modification, the wavelength selection portion 14 is arranged on the focal plane of the imaging optical element 24. Note that the structure of the wavelength selection portion 14 is the same as that of the wavelength selection portion 14 of the optical inspection apparatus 10 shown in FIG. 13. Also, the optical axis OA crosses the first wavelength selection region 31.

Thus, the (1-1)th imaging side solid angle β11 of the first object point O1 and the (2-1)th imaging side solid angle 21 of the second object point O2 equal. Similarly, the (1-2)th imaging side solid angle β12 of the first object point O1 and the (2-2)th imaging side solid angle 22 of the second object point O2 equal. That is, at the first object point O1 and the second object point O2, the solid angles of light beams that reach the wavelength selection regions 31, 32, and 33 equal.

On the other hand, in the illumination side as well, the solid angles of illumination light components that enter the first object point O1 and the second object point O2 equal each other. That is, the (1-1)th illumination side solid angle α11 of the first object point O1 and the (2-1)th illumination side solid angle α21 of the second object point O2 equal.

Thus, if the surface of the object O is a plane, all light beams from object points on the standard surface pass through the same imaging side solid angle. Similarly, at an arbitrary object point, all light beams from a minute defect with same BRDF pass through the same imaging side solid angle. Thus, the processing unit 18 can inspect the color vectors at all object points O1 and O2 by the same standard. That is, at all the object points O1 and O2, the processing unit 18 can obtain information about the direction distribution of light from the direction of a color vector using the same reference direction. Hence, the processing unit 18 can simplify the processing and speed up the processing.

Fourth Embodiment

An optical inspection apparatus 10 according to this embodiment will be described below with reference to FIG. 18. The optical inspection apparatus 10 according to this embodiment is basically the same as the optical inspection apparatus 10 according to the second embodiment (see FIGS. 9 and 10), and the differences will be described.

FIG. 18 is a schematic sectional view of the optical inspection apparatus 10 according to this embodiment. The optical inspection apparatus 10 according to this embodiment includes a wavelength selection portion 14 and an illumination unit 40 on the illumination side. The illumination unit 40 includes a light diffusion portion 42 and an illumination optical element 48. Also, the optical inspection apparatus 10 includes an imaging optical element 24 and an imaging side shielding portion 16 on the imaging side.

The illumination optical element 48 is an imaging optical element that forms an image of light. That is, an element that forms an image of light from an object at an image point can be used. As the illumination optical element 48, for example, a lens, a group lens formed by a plurality of lenses, a concave lens, a convex lens, a GRIN lens, a concave mirror, a convex mirror, a parabolic mirror, a reflector, or the like can be used. That is, any element that forms an image of light can be used as the illumination optical element 48. However, the illumination optical element 48 is not limited to the above in the present embodiment, and the illumination optical element 48 may be a non-imaging optical element. The illumination optical element 48 may be, for example, a CPC (Compound Parabolic Concentrator) or a total-reflection lens. A non-imaging optical element used as the illumination optical element 48 is assumed to have a function of converting a light beam group that has exited from a point into parallel light. Such a point is set to a focal point on the illumination side or an illumination side focal point. There exists at least one point as such a point, and a plane on which the point is placed is set to an illumination side focal plane. That is, the illumination optical element 48 has an illumination side focal plane. An axis that is orthogonal to the illumination side focal plane and passes through the center of the illumination optical element is defined as an illumination side optical axis OA.

In this embodiment, the illumination optical element 48 is a Fresnel lens. As the features, the Fresnel lens has a large effective diameter and is thin.

The wavelength selection portion 14 is arranged on or near the illumination side focal plane of the illumination optical element 48. Note that structure of the wavelength selection portion 14 is the same as that of the wavelength selection portion 14 of the optical inspection apparatus 10 shown in FIG. 13. Also, the optical axis OA crosses a first wavelength selection region 31.

The light diffusion portion 42 is arranged at a position farther apart from the illumination optical element 48 along the illumination side optical axis OA than the wavelength selection portion 14. In this embodiment, the light diffusion portion 42 is arranged such that an image of light from the light diffusion portion 42 is formed by the Fresnel lens at each of object points O1 and O2. However, the light diffusion portion 42 is not limited to the above in the present embodiment, and the light diffusion portion 42 can be arranged at any position farther apart from the illumination optical element 48 along the illumination side optical axis OA than the wavelength selection portion 14.

White light from ambient light reaches the light diffusion portion 42, and the white light is diffused to the wavelength selection portion 14. In this embodiment, ambient light that does not reach the wavelength selection portion 14 is shielded. Here, the light diffusion portion 42 is made of frosted glass. However, any element that diffuses light can be used as the light diffusion portion 42, and a plate to which phosphor is applied, a plate to which a scatterer is applied, a plane having a rough surface, a porous transparent plate, or the like may be used.

In an image sensor 22 of an imaging portion 12, an imaging opening 22*a* is formed between the imaging side shielding portions 16. Light that reaches the imaging side shielding portion 16 is shielded. That is, light from each of the object points O1 and O2, which does not reach the imaging opening 22*a*, does not form an image on the image sensor 22.

The operation of the optical inspection apparatus 10 according to this embodiment will be described.

The first object point O1 is on the standard surface of the object O, and the second object point O2 is on a minute defect of the object O. The BRDF of the standard surface is closed to that of specular reflection, and the distribution is narrower as compared to the BRDF of a minute defect.

The wavelength selection portion 14 includes the first wavelength selection region 31 and a second wavelength selection region 32, and these pass light of the first wavelength spectrum and light of the second wavelength spectrum, respectively. The first wavelength spectrum is blue light, and the second wavelength spectrum is red light. In an image captured by the image sensor 22 of the imaging portion 12, the direction of the first basic color vector corresponding to the first wavelength spectrum and the direction of the second basic color vector corresponding to the second wavelength spectrum are different from each other. A color vector in an image captured by the image sensor 22 by the light that has passed through the wavelength selection portion 14 is the linear combination of the first basic color vector and the second basic color vector.

Ambient light is white light, and is diffused at a first light diffusion point D1 and a second light diffusion point D2 of the light diffusion portion 42. That is, the divergence angle of the ambient light after incidence spreads at the light diffusion points D1 and D2. This can increase the variation of the direction of the light entering the wavelength selection portion 14.

On the other hand, if the light diffusion portion 42 is absent, the direction of the light of the ambient light that directly reaches the wavelength selection portion 14 is substantially parallel. For this reason, light components in various directions cannot be made to enter the object points O1 and O2. That is, since the light diffusion portion 42 exists, various illumination side solid angles can be generated at the object points O1 and O2 without omission of light beams.

Diffused light components diffused at the first light diffusion point D1 and the second light diffusion point D2 pass through the wavelength selection portion 14 and enter the first object point O1 and the second object point O2 via the illumination optical element 48. Here, the wavelength selection portion 14 is arranged on the focal plane of the illumination optical element 48. Hence, the illumination side solid angles at the first object point O1 and the second object point O2 match. That is, a (1-1)th illumination side solid angle α11 matches a (2-1)th illumination side solid angle α21, and a (1-2)th illumination side solid angle α12 matches a (2-2)th illumination side solid angle α22.

If the (1-1)th illumination side solid angle α11 is reflected by the object surface O, and the (1-1)th illumination side solid angle α11 and an imaging opening solid angle β are compared on the imaging side, the (1-1)th illumination side solid angle α11 includes the imaging opening solid angle β on the imaging side ((1-1)th illumination side solid angle α11≥imaging opening solid angle β). On the other hand, if the (1-2)th illumination side solid angle α12 is reflected by the object surface O, and the (1-2)th illumination side solid angle α12 and the imaging opening solid angle β are compared on the imaging side, the (1-2)th illumination side solid angle α12 does not have a common region to the imaging opening solid angle β in the imaging side. If light of the (1-1)th illumination side solid angle α11 enters the first object point O1, a light beam of the (1-1)th light beam direction distribution (BRDF) is reflected. If light of the (1-2)th illumination side solid angle α12 enters the first object point O1, a light beam of the (1-2)th light beam direction distribution (BRDF) is reflected. The imaging side solid angle occupied by the (1-2)th light beam direction distribution (BRDF) does not have a common region to the imaging opening solid angle β. On the other hand, the imaging side solid angle occupied by the (1-1)th light beam direction distribution has a common region to the imaging opening solid angle β. Hence, if the light from the wavelength selection portion 14 enters the first object point O1, the first object point O1 is captured by the image sensor 22 only by the light of the first wavelength spectrum. That is, if the light from the wavelength selection portion 14 enters the first object point O1, light of the second wavelength spectrum is shielded by the imaging side shielding portion 16 whose opening 22*a* is adjusted.

If light of the (2-1)th illumination side solid angle α21 or light of the (2-2)th illumination side solid angle α22 enters the second object point O2, the light beam of a second light beam direction distribution (BRDF) is reflected on both cases. The imaging side solid angle occupied by the second light beam direction distribution has a common region to the imaging opening solid angle β. Hence, if the light from the wavelength selection portion 14 enters the second object point O2, the second object point O2 is captured by the image sensor 22 by both light of the first wavelength spectrum and light of the second wavelength spectrum.

Hence, the direction of the first color vector at the first object point O1 and the direction of the second color vector at the second object point O2 are different from each other. Hence, a processing unit 18 can identify the difference of the spread of the direction distribution of light between the object points O1 and O2. If the processing unit 18 prepares a reference color vector for the BRDF of the standard surface or a minute defect in advance for each of the object points O1 and O2 and stores it in a storage medium or the like, the processing unit 18 can acquire detailed information about the spread of the direction distribution of light by collating the reference color vector with the color vector of the captured image.

In this embodiment, the wavelength selection portion 14 is arranged on the focal plane of the illumination optical element 48. Hence, the illumination side solid angle at the first object point O1 matches that at the second object point O2. This can make the incident light beams of the BRDFs at the object points O1 and O2 equal. That is, the BRDFs at the object points O1 and O2 can be compared under the same incidence condition. This allows the optical inspection apparatus 10 to improve the inspection accuracy.

In this embodiment, the reason why the processing unit 18 can identify the difference of the spread of the light beam direction distribution between the object points O1 and O2 is as follows. That is, this is because "at least one wavelength selection region of the wavelength selection portion 14 is arranged in a place apart from the illumination side focal point, and the illumination side solid angle does not have a common region to the imaging opening solid angle β". Hence, the processing unit 18 can identify the spread of the direction distribution of light depending on whether an image of an object point is formed by the second wavelength spectrum.

As described above, according to this embodiment, it is possible to provide an optical inspection method, a non-transitory storage medium storing an optical inspection program, and the optical inspection apparatus 10 capable of acquiring information of the object O even in a case where light is scattered, diffused, or diffracted in various directions in the object O.

First Modification

The first modification of the fourth embodiment of the optical inspection apparatus 10 will be described with reference to FIG. 19. FIG. 19 is a schematic sectional view of the illumination unit 40 of the optical inspection apparatus 10 according to the first modification of this embodiment.

In the first modification, the optical inspection apparatus 10 includes the illumination unit 40 on the illumination side. The illumination unit 40 includes an LED light source 44, a light diffusion portion 42, an illumination optical element 50, and a heat dissipation portion 52.

The illumination optical element 50 according to this embodiment is, for example, a parabolic mirror, and has an illumination side focal plane 50*a*. The parabolic mirror is a form of a concave mirror.

The LED light source 44 includes, for example, a blue LED 44*a* and a phosphor 44*b*. The phosphor 44*b* is used as a light diffusion portion that diffuses light, and provided on the blue LED 44*a*. Hence, the LED light source 44 emits white diffused light.

The wavelength selection portion 14 includes at least the first wavelength selection region 31 (see FIG. 13) and the second wavelength selection region 32 (see FIG. 13), and these pass light of the first wavelength spectrum and light of the second wavelength spectrum, respectively. Note that the optical axis OA crosses the first wavelength selection region 31. The wavelength selection portion 14 is arranged on or near the illumination side focal plane 50*a*. Also, the second wavelength selection region 32 is arranged at a position apart from the focal point on the illumination side. Hence, "at least one second wavelength selection region 32 of the wavelength selection portion 14 is arranged in a place apart from an illumination side focal plane 50*b*, and the illumination side solid angle does not have a common region to the imaging opening solid angle".

In the first modification, the light diffusion portion 42 includes a white diffusion plate. The white diffusion plate 42 Lambertian-reflects incident light. Between the white diffusion plate 42 and the LED light source 44, the wavelength selection portion 14 is arranged along the optical axis OA on the illumination side, that is, along the light beam path. For example, the white diffusion plate 42 and the wavelength selection portion 14 are integrated. In this modification, of white light from the LED light source 44, light of the first wavelength spectrum and light of the second wavelength spectrum temporarily pass through the wavelength selection portion 14, are reflected by the white diffusion plate 42, and then pass the wavelength selection portion 14 again. That is, the first modification is equivalent to a case where two white diffusion plates 42 are arranged to sandwich the wavelength selection portion 14 along the illumination side optical axis OA.

The heat dissipation portion 52 dissipates heat from the LED light source 44 to the outside of the illumination unit 40.

With the above-described configuration, the illumination unit 40 irradiates the object surface O including the object points O1 and O2 with, of the light from the LED light source 44, light of the first wavelength spectrum and light of the second wavelength spectrum, which pass through the wavelength selection portion 14 and further pass through the white diffusion plate 42 while being diffused, and light of the first wavelength spectrum and light of the second wavelength spectrum, which are reflected by the white diffusion plate 42, pass through the wavelength selection portion 14, and are then reflected by the illumination optical element 50. Hence, in the first modification, the illumination unit 40 can irradiate the object O with light of the first wavelength spectrum and light of the second wavelength spectrum in different directions. Also, if a reflector such as a parabolic mirror is used as the illumination optical element 50, as in the first modification, the illumination unit 40 can effectively use many light beams as illumination as compared to a case where a lens is used. Also, if such a reflector is used, no chromatic aberration occurs in the illumination unit 40 as compared to a lens. This allows the optical inspection apparatus 10 to improve the direction accuracy of the illumination side solid angle.

Second Modification

The second modification of the fourth embodiment of the optical inspection apparatus 10 will be described with reference to FIGS. 20 and 21. FIG. 20 is a top view of the wavelength selection portion 14 of the optical inspection apparatus 10 according to the second modification of the fourth embodiment, and FIG. 21 is a sectional view taken along a line XXI-XXI in FIG. 20.

In the second modification, the wavelength selection portion 14 on the illumination side is concentric at the center and 120°-rotational symmetric on the outer side. In other words, the wavelength selection portion 14 is axis-symmetric at the center and changes in azimuth angle directions on the outer side. In the wavelength selection portion 14, the concentric center is formed by the first wavelength selection region 31 and the second wavelength selection region 32, and the 120°-rotational symmetric regions on the outer side are formed by the third wavelength selection region 33, a fourth wavelength selection region 34, and a fifth wavelength selection region 35. Note that the second wavelength selection region 32 is provided on the outer peripheral side of the first wavelength selection region 31. Also, the third wavelength selection region 33, the fourth wavelength selection region 34, and the fifth wavelength selection region 35 are provided on the outer peripheral side of the second wavelength selection region 32 at an interval of 120° in the circumferential direction.

By using the wavelength selection portion 14, the optical inspection apparatus 10 can obtain information about the spread of the direction distribution of light (BRDF) by the processing unit 18, and also obtain information about the azimuth angle directions of the direction distribution of light. That is, the processing unit 18 can acquire a more detailed BRDF distribution. Thus, the optical inspection apparatus 10 can improve the inspection accuracy.

In the second modification, the wavelength selection portion 14 on the illumination side has been described. However, the wavelength selection portion 14 shown in FIGS. 20 and 21 may be used as the wavelength selection portion on the imaging side (see FIGS. 1, 6, 7, 9, 10, 13, 17, 18, and 19). This can obtain the same effects as described above.

Fifth Embodiment

Figure 22:
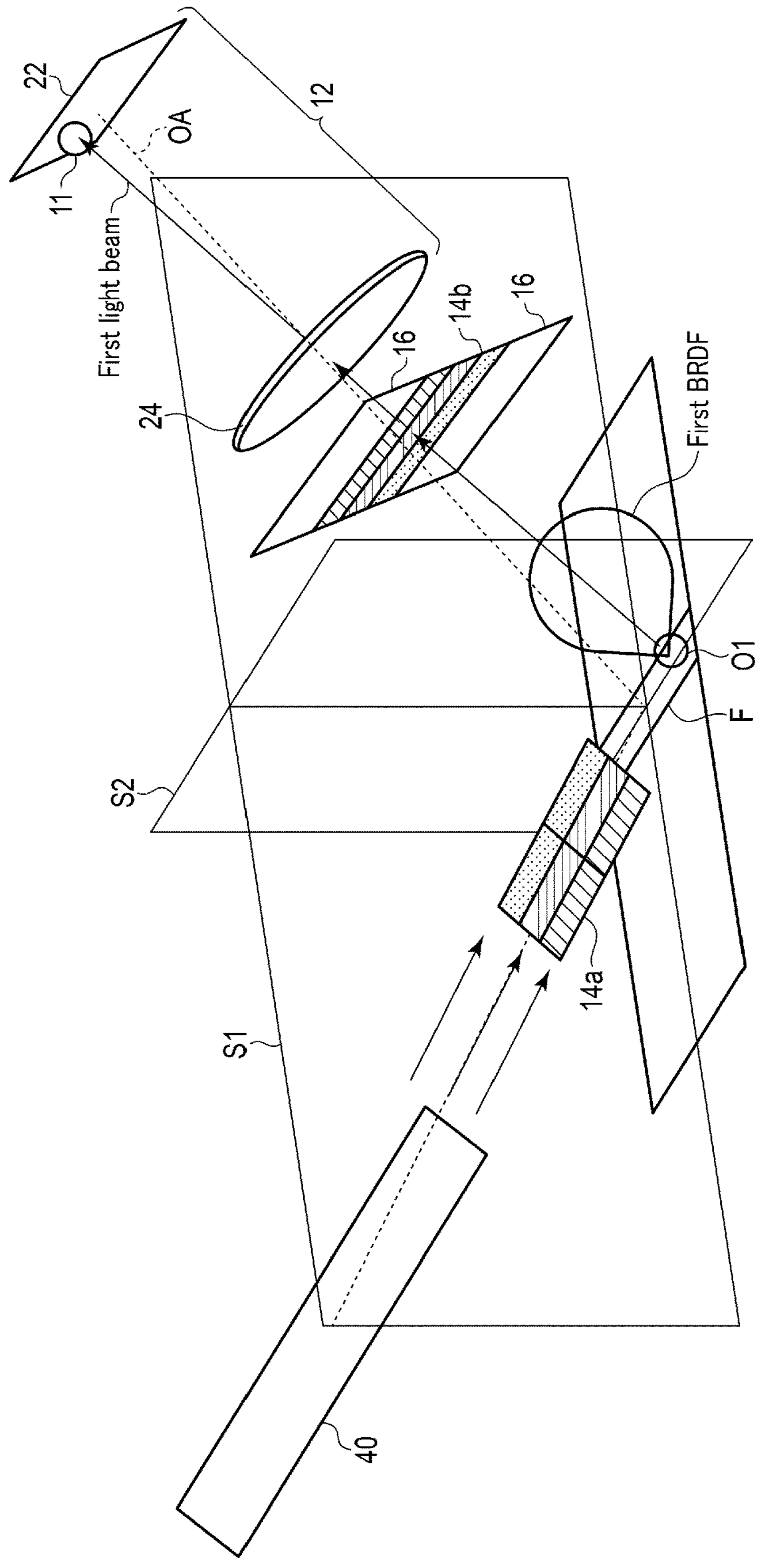
FIG. 22 is a schematic view showing an optical inspection apparatus according to the fifth embodiment.

An optical inspection apparatus 10 according to this embodiment will be described below with reference to FIG. 22. FIG. 22 is a perspective view of the optical inspection apparatus 10 according to this embodiment. Note that in FIG. 22, a processing unit 18 of the optical inspection apparatus 10 is not illustrated. The optical inspection apparatus 10 is basically the same as in the third embodiment shown in FIG. 13. The differences will be described below.

The optical inspection apparatus 10 according to this embodiment includes wavelength selection portions 14*a* and 14*b* on both the illumination side and the imaging side with respect to an object surface O, respectively. That is, the optical inspection apparatus 10 includes the illumination side wavelength selection portion 14*a* and the imaging side wavelength selection portion 14*b*. The surface (object surface O) of the object O is a plane. Also, the standard surface is substantially a mirror surface.

An imaging portion 12 includes an image sensor 22 and an imaging optical element 24. The image sensor 22 of the imaging portion 12 is a line sensor.

The illumination side wavelength selection portion 14*a* and the imaging side wavelength selection portion 14*b* are configured to have a complementary color relationship under specular reflection conditions. That is, if the surface of the object O is a mirror surface, light of a wavelength spectrum passing through the illumination side wavelength selection portion 14*a* is specularly reflected by the surface of the object O and shielded by the imaging side wavelength selection portion 14*b*. On the other hand, if the surface of the object O is not a mirror surface but a rough surface, light of a wavelength spectrum passing through the illumination side wavelength selection portion 14*a* is scattered by the surface of the object O, the BRDF spreads, and light components of some wavelength spectra pass through the imaging side wavelength selection portion 14*b*.

Both the illumination side wavelength selection portion 14*a* and the imaging side wavelength selection portion 14*b* include a plurality of wavelength selection regions extending in a diction along the longitudinal direction of the line sensor 22. In both the illumination side wavelength selection portion 14*a* and the imaging side wavelength selection portion 14*b*, the wavelength selection regions are arranged in a direction orthogonal to the longitudinal direction of the wavelength selection regions, and the plurality of wavelength selection regions are arrayed in a stripe pattern as a whole. On the wavelength selection portions 14*a* and 14*b*, a direction along a direction in which the wavelength selection regions change is defined as an array direction. In addition, imaging side shielding portions 16 are provided on the outer sides of the imaging side wavelength selection portion 14*b*.

If a light beam is projected to a cross section including an optical axis OA of the imaging optical element 24 on the imaging side and including the array direction of the illumination side wavelength selection portion 14*a* and the imaging side wavelength selection portion 14*b*, light from an illumination unit 40 becomes a light (condensed light) condensed to the object point O. This is defined as a first cross section S1. On the other hand, a cross section orthogonal to the first cross section si is defined as a second cross section S2. If a light beam is projected to the second cross section S2, the light from the illumination unit 40 becomes not condensed light but conversely diverged diffused light (divergent light).

Each of the illumination side wavelength selection portion 14*a* and the imaging side wavelength selection portion 14*b* includes a plurality of wavelength selection regions. Since each wavelength selection region has a stripe shape, a plurality of wavelength selection regions are arranged on the first cross section S1. That is, the first cross section S1 includes a direction in which the wavelength selection regions of the illumination side wavelength selection portion 14*a* and the imaging side wavelength selection portion 14*b* are arranged.

Of light emitted from the illumination unit 40, light components of wavelength spectra corresponding to the wavelength selection regions of the illumination side wavelength selection portion 14*a* pass through the illumination side wavelength selection portion 14*a* to irradiate the surface of the object O and form an irradiation field F. If a minute defect exists at a first object point O1 on the surface of the object O, light components of wavelength spectra corresponding to the wavelength selection regions of the imaging side wavelength selection portion 14*b* pass through the imaging side wavelength selection portion 14*b* to form an image of the first object point O1 on the line sensor (image sensor) 22. On the other hand, if the first object point O1 is on the standard surface, illumination is shielded by the imaging side wavelength selection portion 14*b*. This is because the wavelength selection regions of the illumination side wavelength selection portion 14*a* and the imaging side wavelength selection portion 14*b* are configured (arranged) in a complementary color relationship.

If a light beam is projected to the first cross section S1, the light that passes through the wavelength selection regions of the imaging side wavelength selection portion 14*b* changes due to the spread of the distribution of a first BRDF. On the other hand, assuming that a light beam is projected to the second cross section S2, since light from the illumination unit 40 is diffused light, it is found that the field angle on the imaging portion 12 is wide. That is, according to this embodiment, the field angle in the longitudinal direction of the image sensor 22 can be widely effectively used. Also, since the imaging side wavelength selection portion 14_b_ is arranged in front of the imaging portion 12 (the imaging optical element 24 and the line sensor 22), the optical system can easily be assembled for any imaging portion 12 (that is, a camera).

According to this embodiment, it is possible to obtain information about the spread of the direction distribution of light at the object point O. This allows a processing unit 18 to inspect the surface property or shape of the object O.

As described above, according to this embodiment, it is possible to provide an optical inspection method, a non-transitory storage medium storing an optical inspection program, and the optical inspection apparatus 10 capable of acquiring information of the object O even in a case where light is scattered, diffused, or diffracted in various directions in the object O.

According to at least one embodiment described above, it is possible to provide an optical inspection method, a non-transitory storage medium storing an optical inspection program, and the optical inspection apparatus 10 capable of acquiring information of the object O even in a case where light is scattered, diffused, or diffracted in various directions in the object O.

According to the at least one embodiment described above, the following appendixes are obtained.

[1]. An optical inspection method comprises:

passing illumination light through a wavelength selection portion and irradiating an object point with the illumination light, wherein:

the illumination light has at least two different first and second wavelength spectra, and the wavelength selection portion includes:

a first wavelength selection region that is configured to shield a light component of at least one wavelength not included in a light component of the first wavelength spectrum, and a second wavelength selection region that is configured to shield a light component of at least one wavelength not included in a light component of the second wavelength spectrum;

causing the imaging portion including at least two color channels configured to receive the light component of the first wavelength spectrum and the light component of the second wavelength spectrum to capture the object point, such that:

with an object surface as a boundary including the object point captured as an image by the light that has passed through an imaging opening of the imaging portion, a side closer to the imaging portion is defined as an imaging side and a side far from the imaging portion is defined as an illumination side;

with respect to the object point, a first illumination side solid angle corresponding to the first wavelength selection region and a second illumination side solid angle corresponding to the second wavelength selection region are defined;

with respect to the object point, an imaging opening solid angle corresponding to the imaging opening is defined;

one of the first illumination side solid angle and the second illumination side solid angle does not have a common region to the imaging opening solid angle;

defining the light component of the first wavelength spectrum and the light component of the second wavelength spectrum as signal vectors having different directions based on light reception data by the at least two color channels for the object point; and estimating spread of a direction distribution of the light at the object point based on the directions of the signal vectors.

[2]. The method according to [1], further comprises:

diffusing the light components of the at least two different wavelength spectra by a light diffusion portion and passing the light components, and then, passing the light components through the wavelength selection regions.

[3]. The method according to [2], further comprises:

multiplexing the light components of the at least two different wavelength spectra and then passing the light components through the light diffusion portion.

[4]. A non-transitory storage medium storing an optical inspection program is configured to cause a computer to execute:

passing the illumination light through a wavelength selection portion and irradiating an object point with the illumination light, wherein the illumination light has at least two different first and second wavelength spectra, and the wavelength selection portion includes:

a first wavelength selection region that is configured to shield a light component of at least one wavelength not included in a light component of the first wavelength spectrum, and a second wavelength selection region that is configured to shield a light component of at least one wavelength not included in a light component of the second wavelength spectrum;

causing the imaging portion including at least two color channels configured to receive the light component of the first wavelength spectrum and the light component of the second wavelength spectrum to capture the object point, such that:

with an object surface as a boundary including the object point captured as an image by the light that has passed through an imaging opening of the imaging portion, a side closer to the imaging portion is defined as an imaging side and a side far from the imaging portion is defined as an illumination side;

with respect to the object point, a first illumination side solid angle corresponding to the first wavelength selection region and a second illumination side solid angle corresponding to the second wavelength selection region are defined;

with respect to the object point, an imaging opening solid angle corresponding to the imaging opening is defined;

one of the first illumination side solid angle and the second illumination side solid angle does not have a common region to the imaging opening solid angle;

defining the light component of the first wavelength spectrum and the light component of the second wavelength spectrum as signal vectors having different directions based on light reception data by the at least two color channels for the object point; and estimating spread of a direction distribution of the light at the object point based on the directions of the signal vectors.

[5]. An optical inspection apparatus comprises one or more processor configured to read out the optical inspection program defined in [4] from the non-transitory storage medium storing the optical inspection program and configured to execute the optical inspection program.

[6]. An optical inspection apparatus comprises:

a wavelength selection portion including:

a first wavelength selection region that is configured to shield a light component of at least one wavelength not included in a light component of a first wavelength spectrum in illumination light including at least two different wavelength spectra, and a second wavelength selection region that is configured to shield a light component of at least one wavelength not included in a light component of a second wavelength spectrum in illumination light including at least two different wavelength spectra, and the wavelength selection portion being configured to pass the illumination light toward an object point;

an imaging portion including an image sensor including color channels configured to receive the light component of the first wavelength spectrum and the light component of the second wavelength spectrum in reflected light from the object point as signal vectors having different directions; and a shielding portion configured to define an imaging opening that is configured to receive the light from the object point in the image sensor, wherein:

with an object surface as a boundary including the object point captured as an image by the light that has passed through the imaging opening, a side closer to the imaging portion is defined as an imaging side, and a side far from the imaging portion is defined as an illumination side, with respect to the object point, a first illumination side solid angle corresponding to the first wavelength selection region and a second illumination side solid angle corresponding to the second wavelength selection region are defined, with respect to the object point, an imaging opening solid angle corresponding to the imaging opening is defined, and the shielding portion defines the imaging opening such that one of the first illumination side solid angle and the second illumination side solid angle does not have a common region to the imaging opening solid angle.

[7]. An optical inspection apparatus comprises:

a wavelength selection portion including:

a first wavelength selection region that is configured to shield a light component of at least one wavelength not included in a light component of a first wavelength spectrum in illumination light including at least two different wavelength spectra, and a second wavelength selection region that is configured to shield a light component of at least one wavelength not included in a light component of a second wavelength spectrum in illumination light including at least two different wavelength spectra, and the wavelength selection portion being configured to pass the illumination light toward an object point;

an image sensor including, in each pixel, a first color channel configured to receive the light component of the first wavelength spectrum, and a second color channel configured to receive the light component of the second wavelength spectrum from the object point, and the image sensor being configured to receive the light component of the first wavelength spectrum and the light component of the second wavelength spectrum as different signals; and a shielding portion configured to set an imaging opening for light to be received by the image sensor such that in a pixel of the image sensor corresponding to the object point, a magnitude relationship of a pixel value between the first color channel and the second color channel changes in accordance with spread of a direction distribution of light at the object point.

[8]. The apparatus according to [6] or [7], further comprises an illumination unit including a light diffusion portion configured to diffuse the illumination light such that the illumination light is branched into light components in at least two different directions and then make the light components enter the wavelength selection portion.

[9]. The apparatus according to [8], wherein the wavelength selection portion is provided on at least one of the image sensor and the illumination unit.

[10]. The apparatus according to any one of [6] to [9], further comprises an illumination optical element forming an image of the light that has passed through the wavelength selection portion.

[11]. The apparatus according to any one of [6] to [10], further comprises an illumination unit configured to emit parallel light.

[12]. The apparatus according to any one of [6] to [11], wherein the wavelength selection portion includes:

a first set in which a plurality of wavelength selection regions different from each other are arranged; and a second set in which the plurality of wavelength selection regions are arranged in the same array as the first set.

[13]. The apparatus according to [6], further comprises one or more processor configured to:

cause the image sensor to capture the object surface, create a background image based on the captured image, and create a background removed image by subtracting the background image from the captured image.

[14]. The apparatus according to any one of [6] to [11], further comprises an illumination optical element forming an image of light, wherein the wavelength selection portion is arranged on a focal plane of the illumination optical element.

[15]. The apparatus according to any one of [6] to [11], further comprises an imaging optical element provided in at least one of a place between the object point and the image sensor, a place between the wavelength selection portion and the image sensor, and a place between the object point and the wavelength selection portion, and the imaging optical element forming images of the light component of the first wavelength spectrum and the light component of the second wavelength spectrum on the image sensor.

[16]. The apparatus according to any one of [6] to [11], further comprises:

a concave mirror including an illumination side focal plane, in which the wavelength selection portion is arranged on or near the illumination side focal plane; and a light source configured to emit white light, wherein:

the first wavelength selection region of the wavelength selection portion is provided on a focal point of the illumination side focal plane, and the second wavelength selection region of the wavelength selection portion is provided on a position apart from the focal point of the illumination side focal plane.

[17]. An optical inspection apparatus comprises:

a wavelength selection portion including:

a first wavelength selection region that is configured to pass a light component of a first wavelength spectrum and is configured to shield a light component having at least one wavelength not included in the wavelength spectrum;

a second wavelength selection region that is configured to pass a light component of a second wavelength spectrum and is configured to shield a light component having at least one wavelength not included in the wavelength spectrum; and a third wavelength selection region that is configured to pass a light component of a third wavelength spectrum and is configured to shield a light component having at least one wavelength not included in the wavelength spectrum, when an object surface including an object point is irradiated with illumination light including the light component of the first wavelength spectrum, the light component of the second wavelength spectrum different from the light component of the first wavelength spectrum, and the light component of the third wavelength spectrum different from the light component of the first wavelength spectrum and the light component of the second wavelength spectrum, and an image sensor including, in each pixel, a first color channel configured to receive the light component of the first wavelength spectrum, a second color channel configured to receive the light component of the second wavelength spectrum from the object point, and a third color channel configured to receive the light component of the third wavelength spectrum, and the image sensor being configured to receive the light component of the first wavelength spectrum, the light component of the second wavelength spectrum, and the light component of the third wavelength spectrum as different signal vectors, wherein the wavelength selection portion and the image sensor are arranged such that in a pixel of the image sensor corresponding to the object point, a magnitude relationship of a pixel value between the first color channel, the second color channel, and the third color channel changes in accordance with spread of a direction distribution of light at the object point.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An optical inspection method comprising:

causing a wavelength selection portion to selectively pass light components including at least two different wavelength spectra from an object point and causing an imaging portion including at least two color channels configured to receive the light components of the wavelength spectra to capture the object point;

defining the light components of the at least two different wavelength spectra as signal vectors having different directions based on light reception data in the at least two color channels for the object point; and estimating spread of a direction distribution of light at the object point based on the directions of the signal vectors, wherein:

the wavelength selection portion includes:

a first set in which a plurality of wavelength selection regions different from each other are arranged; and a second set in which the plurality of wavelength selection regions are arranged in the same array as the first set, and the wavelength selection portion introduces a periodic background noise component into a captured image.

2. The optical inspection method according to claim 1, wherein the signal vectors are vectors having, as an end point, a point on a color coordinate space on which pixel values of the at least two color channels are plotted on coordinates orthogonal to each other.

3. The optical inspection method according to claim 1, wherein the estimating includes collating a captured image by the light reception data with a reference image and estimating the spread of the direction distribution of the light at the object point.

4. The optical inspection method according to claim 1, wherein the wavelength selection portion is positioned closer to the object point than the imaging portion.

5. A non-transitory storage medium storing an optical inspection program configured to cause a computer to execute:

causing a wavelength selection portion to selectively pass light components including at least two different wavelength spectra from an object point and causing an imaging portion including at least two color channels configured to receive the light components of the wavelength spectra to capture the object point;

defining the light components of the at least two different wavelength spectra as signal vectors having different directions based on light reception data in the at least two color channels for the object point; and estimating spread of a direction distribution of light at the object point based on the directions of the signal vectors, wherein:

the wavelength selection portion includes:

a first set in which a plurality of wavelength selection regions different from each other are arranged; and a second set in which the plurality of wavelength selection regions are arranged in the same array as the first set, and the wavelength selection portion introduces a periodic background noise component into a captured image.

6. The non-transitory storage medium according to claim 5, wherein the wavelength selection portion is positioned closer to the object point than the imaging portion.

7. An optical inspection apparatus comprising one or more processors configured to read out the optical inspection program defined in claim 5 from the non-transitory storage medium and execute the optical inspection program.

8. An optical inspection apparatus comprising one or more processors configured to cause a wavelength selection portion to selectively pass light components including at least two different wavelength spectra from an object point and cause an imaging portion including at least two color channels configured to receive the light components of the wavelength spectra to capture the object point;

define the light components of the at least two different wavelength spectra as signal vectors having different directions based on light reception data in the at least two color channels for the object point; and estimate spread of a direction distribution of light at the object point based on the directions of the signal vectors, wherein:

the wavelength selection portion includes:

a first set in which a plurality of wavelength selection regions different from each other are arranged; and a second set in which the plurality of wavelength selection regions are arranged in the same array as the first set, and the wavelength selection portion introduces a periodic background noise component into a captured image.

9. The optical inspection apparatus according to claim 8, further comprising an optical system configured to make the signal vectors corresponding to the light components of the at least two different wavelength spectra linearly independent of each other.

10. The optical inspection apparatus according to claim 8, further comprising:

the imaging portion including the color channels controlled by the one or more processors;

the wavelength selection portion configured to selectively pass the light components including the at least two different wavelength spectra from the object, the wavelength selection portion being provided between the object point and the imaging portion; and a shielding portion configured to shield light that is configured to be captured without passing through the wavelength selection portion.

11. The optical inspection apparatus according to claim 10, wherein the first set and the second set of the wavelength selection portion respectively include:

a first wavelength selection region that is configured to shield a light component of at least one wavelength not included in a light component of a first wavelength spectrum and a second wavelength selection region that is configured to shield a light component of at least one wavelength not included in a light component of a second wavelength spectrum in light components including at least two different wavelength spectra, and the shielding portion includes a shielding region provided between the first wavelength selection region and the second wavelength selection region and configured to shield the light component of the first wavelength spectrum and the light component of the second wavelength spectrum.

12. The optical inspection apparatus according to claim 8, wherein the first set and the second set are arranged on the same surface.

13. The optical inspection apparatus according to claim 8, wherein the wavelength selection portion is positioned closer to the object point than the imaging portion.

* * * * *